US005985402A

United States Patent [19]

Nakamura et al.

[11] Patent Number: 5,985,402

[45] Date of Patent: *Nov. 16, 1999

[54] MAGNETIC DISK AND ITS MANUFACTURING METHOD

[75] Inventors: Takao Nakamura, Yokohama; Takaaki Shirakura, Chigasaki; Hiroyuki Kataoka, Yokohama, all of Japan

[73] Assignee: Hitachi, Ltd., Tokyo, Japan

[ * ] Notice: This patent is subject to a terminal disclaimer.

[21] Appl. No.: 07/933,893

[22] Filed: Aug. 24, 1992

Related U.S. Application Data

[63] Continuation of application No. 07/224,360, Jul. 26, 1988, abandoned.

[30] Foreign Application Priority Data

| | | | |
|---|---|---|---|
| Dec. 19, 1986 | [JP] | Japan | 61-301209 |
| Jul. 29, 1987 | [JP] | Japan | 62-187657 |
| Nov. 26, 1987 | [JP] | Japan | 62-296016 |

[51] Int. Cl.[6] ..... G11B 5/66

[52] U.S. Cl. ..... 428/65.3; 428/141; 428/694 ST; 428/694 SG

[58] Field of Search ..... 428/141, 900, 428/65.3, 694 ST, 694 SG

[56] References Cited

U.S. PATENT DOCUMENTS

| | | | |
|---|---|---|---|
| 4,514,451 | 4/1985 | Suzuki et al. | 428/141 |
| 4,540,618 | 9/1985 | Suzuki et al. | 428/141 |
| 4,670,319 | 6/1987 | Katoh et al. | 428/141 |
| 4,680,217 | 7/1987 | Kanesaki et al. | 428/141 |
| 4,698,251 | 10/1987 | Fukada et al. | 428/65.7 |
| 4,720,412 | 1/1988 | Katoh et al. | 236/46 R |
| 4,762,742 | 8/1988 | Sonoda et al. | 428/141 |
| 5,202,810 | 4/1993 | Nakamura et al. | 360/135 |

FOREIGN PATENT DOCUMENTS

| | | |
|---|---|---|
| 5423294 | of 0000 | Japan . |
| 62219227 | of 0000 | Japan . |
| 57-64332 | 4/1982 | Japan . |
| 59-148134 | 8/1984 | Japan . |
| 080825 | 4/1987 | Japan . |
| 156650 | 6/1988 | Japan . |

*Primary Examiner*—Leszek Kiliman

*Attorney, Agent, or Firm*—Fay, Sharpe, Beall, Fagan, Minnich & McKee

[57] ABSTRACT

In a thin film magnetic disk, a micro projections are formed on a substrate in a circumferential direction. A height of the micro projections is several nm to several tens of nm and a density of the micro projections is several hundred pcs/mm to several tens of thousands of pcs/mm$^2$. With this arrangement, a magnetic disk fulfilling a head floating characteristic of a narrow space and further fulfilling a mechanical anti-sliding characteristic such as a contact start-stops characteristic and a head stickiness and the like is provided so that high reliability is attained. In the thin film magnetic disk, a bearing ratio curve of a sectional shape measured in a radial direction of the textured substrate has a bearing ratio of 0.1 to 10% at the surface layer (a cutting height of 5 to 10 nm). In this way, a pressure receiving area under a sliding of the magnetic head is increased.

12 Claims, 13 Drawing Sheets

MAGNETIC DISK AND ITS MANUFACTURING METHOD

This application is a continuation of application Ser. No. 07/224,360, filed Jul. 26, 1988 now abandoned.

BACKGROUND OF THE INVENTION

This invention relates to the surface character of a thin film magnetic disk, and more particularly to a magnetic disk having a preferable surface character with respect to a durability of the disk surface such as head flyability, contact start-stops characteristic and head stickiness for a thin film magnetic disk.

In the conventional system, it has been found that as described in Japanese Patent Application Laid-Open No. 62-219227 a substrate having micro projections in a substrate for a thin film magnetic disk (a surface work for forming the micro projections is hereinafter referred to as texture) has surface unevenness with its maximum roughness of 0.02 to 0.1 μm, and as shown in FIG. 10, a non-magnetic metallic layer 31 and a magnetic thin film medium 32 are formed on the substrate 1, resulting in that a coercive force of the thin magnetic film becomes more than 500 Oe in the above-mentioned maximum surface roughness and so a non-magnetic metallic film (a chromium film) can be made thin to improve productivity. As a result of a contact start-stop test, no scars have been found on the disk surface under twenty thousand times of testing. However, when the maximum surface roughness is more than 0.1 μm, a head crush may easily occur and if no texture is applied, a scar may occur at times over 5,000 times of a contact start-stop test and then the head crush is generated.

As the conventional type of texture, as an example, as described in Jap. Pat. Laid-Open No. 54-23294, it employs a method and a disk working device as illustrated in FIGS. 7, 8 and 12. In the drawings, 2 designates a substrate relating to a disk, central lines of a pair of contact rollers 8 (both of them are made of resilient rubber) are arranged in a radial direction of this disk so as to hold this disk and then a grinding tape 4 (4A and 4B) running upward and downward is placed between the contact roller 8 (8A and 8B) and the disk 2. Simultaneously with a pressing of the contact roller and a rotation of the disk, the contact roller 8 is reciprocated and slid in a radial direction, to make a simultaneous working of both surfaces of the disk. According to this texture, it is possible to form micro projections without grinding unevenness. However, it shows a problem that a non-stable raising part is generated at the shoulder portions of the micro projections along with this formation and the raised portions are left as micro projections on the surface.

It is described that in the prior art, uneven surfaces with a maximum surface roughness of 0.02 μm to 0.1 μm are formed on the surface of the substrate (texture), thereby even if a thickness of the non-magnetic metallic layer (chromium film) is made thin, a coercive force of the magnetic thin film medium (Co—Ni) is more than 500 Oe and it may fulfill a contact start-stop characteristic of twenty thousand times without generating any head crush. However, in the prior art, only the maximum surface roughness is restricted or defined, and so if a texture for forming micro projections is applied to the substrate covered with aluminum alloy or anode oxidization aluminum or Ni—P plating or the like, fine projections are generated on the shoulder portions of the micro projections. Due to the fine projections, if a floating test for the head is carried out in a narrow clearance, for example, in a head floating clearance of 0.2 μm, the head and the micro projections may intermittently contact each other, resulting in damaging a head floating characteristic to cause a head crush. In addition, the upper-most surface of the disk is varied under a sliding movement of the head in case of performing a test of contact start-stops, a disk surface is made smooth under this variation, a horizontal resistance applied to the head is increased and this causes head crush. In view of this fact, it is important to define the micro projections under the texture and a mere definition of the maximum surface roughness can not explain the effects on disk start-stops or head crush. No consideration is made of a shape of projection or a repetition time from the mean surface rather than from the maximum surface roughness. In addition, no most important proposal for the shape of the uneven surface of the substrate has been identified for improving the head crush or a start-stops characteristic.

In this specification, the micro projection designates a respective mountain having a minute height and located in a pseudo circumferential direction of the disk or in respect to the texture formed helically as shown "A" in FIG. 31, as to the surface roughness curve being measured in a radial direction of the disk from its central line to the projected direction. A height of the micro projection designates a distance between a top of a respective mountain and the central line. In FIG. 31, a reference character B designates a curve of section and a reference character C designates a center line, respectively.

SUMMARY OF THE INVENTION

It is an object of the present invention to provide a magnetic disk having a superior head floating characteristic and a high reliability by a method wherein a substrate having a Ni—P plating is worked with texture for forming the most suitable surface character that is applied in consideration of the sliding characteristics such as a head crush cause, a contact start-stops characteristic and a head stickiness and the like.

In order to accomplish the above-described object, in the present invention for making a thin film magnetic disk, micro projections are formed on the substrate in its circumferential direction, a height of each micro projection is several nm to several tens nm and a density of presence of the micro projection is several hundred $mm/^2$ to several tens of thousands $mm/^2$. With this arrangement, the present invention provides a highly reliable magnetic disk fulfilling a head floating characteristic in a narrow space and further fulfilling a mechanical anti-sliding characteristic such as a contact start-stops characteristic or a head stickiness and the like.

In addition, the present invention provides a highly reliable thin magnetic disk in which a bearing ratio curve for a sectional shape measured in a radial direction of the textured substrate has a surface expressing a surface condition with a cutting length ratio of 0.1 to 10% at the surface layer (a cutting height is 5 to 10 nm) so that a pressure receiving area caused by the sliding movement of the magnetic disk is increased and thus its anti-sliding characteristic is improved.

Further, in respect to a simultaneous working of both surfaces of the substrate of the thin film magnetic disk, the surface of the substrate is worked while a first grinding tape is being oscillated in a radial direction of the disk rotated under a desired pressing force and a relative speed and slid. Further, a second grinding tape having particles of a diameter smaller than that of the first grinding tape is applied and the pressing force is made low and the relative speed is made high. With this arrangement, the top portions of the micro projection on the worked surface are made flat and it is possible to provide a substrate for a magnetic disk fulfilling various conditions required for making an anti-sliding characteristic of the magnetic disk such as a head floating characteristic, a contact start-stops characteristic and a head stickiness and the like.

Further, it is possible to provide the above-mentioned highly reliable magnetic disk capable of forming uniform micro projections over an entire disk surface by an apparatus for working both surfaces of the disk with grinding tapes comprising a pair of contact rollers installed at both sides of the disk pressing the grinding tapes against the disk surfaces with a desired minute pressing force; parallel leaf springs for supporting the contact rollers and for applying a minute pressing force to them; a pressure applying and moving means for moving the parallel leaf springs, adjusting influence of a back tension and the like caused by a taking-up of the grinding tapes and adding a minute pressing force; and a pressure measuring means fixed to the parallel leaf springs for use in detecting the above-mentioned pressing force during rotation of the disk and reciprocating movement of the contact roller unit.

BRIEF DESCRIPTION OF THE DRAWINGS

FIG. 15*a* shows a sectional shape before a contact start-stops is performed.

FIG. 15*b* shows a sectional shape after 20,000 times of a contact start-stops operation.

FIGS. 22 and 23 show a result of investigation of a head floating characteristic in respect to the magnetic disk before and after the present invention is applied, wherein FIG. 22 is a graph for showing an output of a piezo crystal head mounted on a floating magnetic head for the case before the present invention is applied and FIG. 23 shows a case after the present invention is applied.

DESCRIPTION OF THE PREFERRED EMBODIMENTS

This invention has a feature that numerous mean micro projections are formed on a substrate for a magnetic disk, for example, an aluminum alloy, anode aluminum oxide, aluminum alloy coated with Ni—P plating and the like, or on a substrate of glass or plastic.

Figure 11:
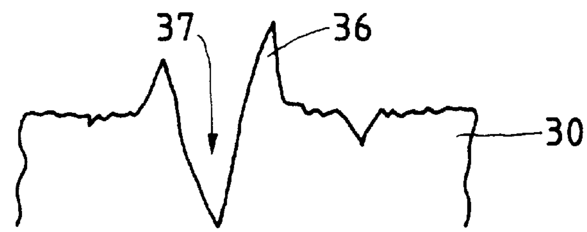
FIG. 11 is an illustrative view for showing a sectional shape of a micro projection.

In these micro projections, their shoulders are formed with raised portions 36 as shown in FIG. 11 by forming the micro projection with a diamond byte or a cutting tool having micro grinding particles on the surface of the substrate. A height of these micro projections is set in reference to a depth or a size of a groove 37 and a density of micro projection is set by a machining condition such as a density of micro grinding particles or a feeding distance of the tool and the like.

Figure 13:
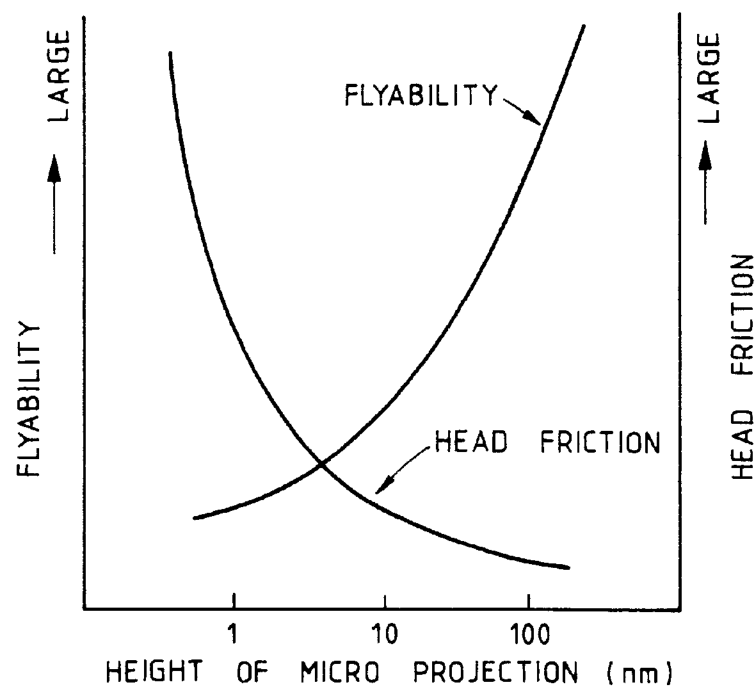
FIGS. 13 and 14 show one example of a result of investigation of a height of micro projection, a density and a characteristic of a magnetic disk, respectively.
Figure 14:
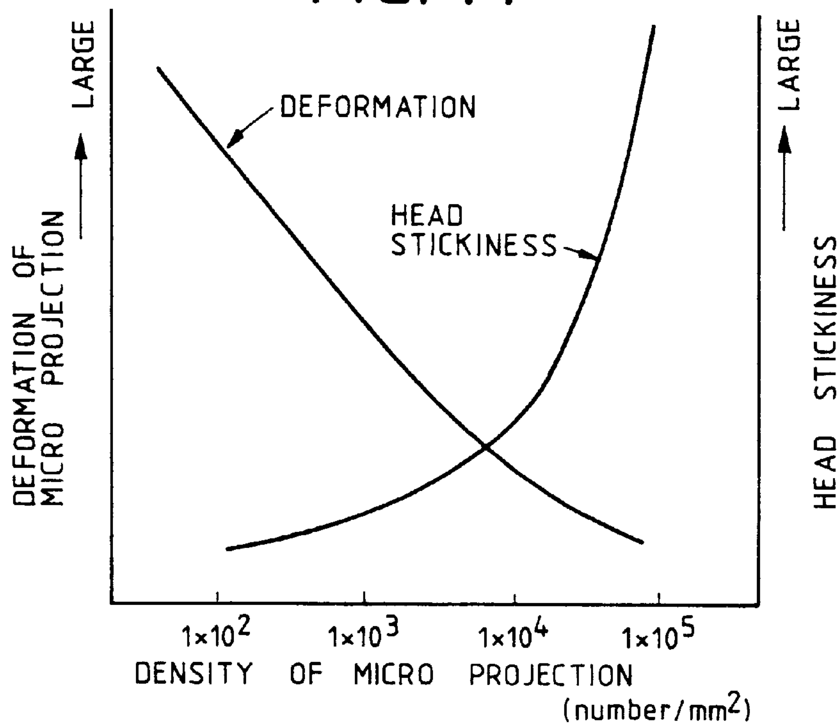

A requisite point required for a surface character of the magnetic disk consists in fulfilling various characteristics of the magnetic disk such as an electrical characteristic, a contact start-stops characteristic and a head stickness and the like without generating any head crush. In the magnetic disk, it is required that a super smooth surface of the disk is attained for avoiding a crushing between the head and the disk due to the fact that a head floating clearance becomes narrow for accomplishing a high density. In turn, the head and the disk are contacted with each other when they are stopped in order to reduce a processing time and so a so-called contact start-stops (hereinafter abbreviated to CSS) is performed to cause the head to be floated as the disk is rotated. Due to this fact, in case that the disk surface has a smooth surface, i.e. a quite small surface roughness, the head and the disk may generate a head stickiness due to the presence of lubricant or moisture in the atmosphere on the disk when they are stopped, and so it poses a problem that an element for supporting the head or arm can be damaged or its rotational driving can not be performed. In FIGS. 13 and 14 are illustrate results of an experiment performed by the inventors. These figures show a relation between a height of micro projection, a density and a head floating characteristic, a head stickiness through a texture work formed in the substrate (its details will be described later) by using the grinding tape. In reference to these results, it is apparent that there is a most suitable range of the surface layer for fulfilling two characteristics, a head floating characteristic and a head stickiness.

Further, the above-described surface character and a start-stops characteristic will be described in reference to the drawings.

Figure 27:
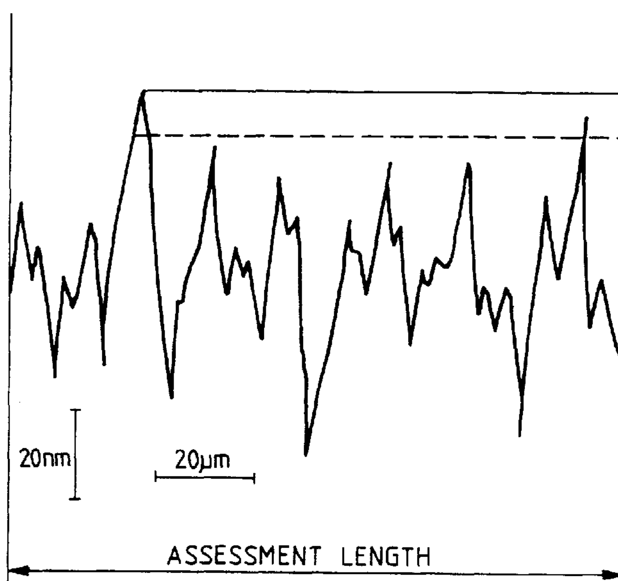
FIGS. 27, 28, 29 and 30 illustrate a relation between the sectional shape of a texture worked surface and a bearing ratio curve and also indicate a relation with a characteristic of contact start-stops.
Figure 28:
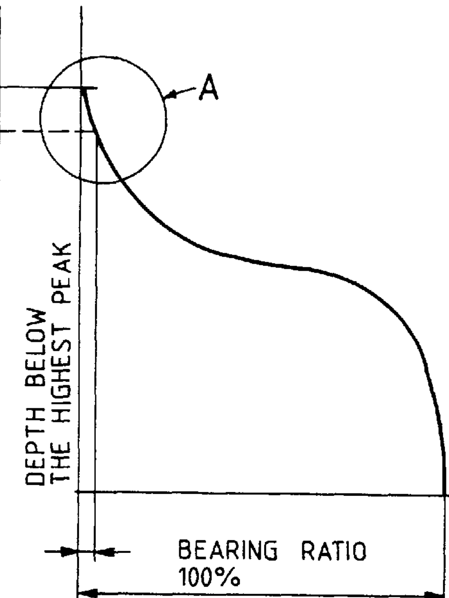

FIG. 27 illustrates a sectional shape of a surface to which a texture work is applied and also to the substrate by using minute or fine grinding particles, where the micro projections are present with a certain disturbance. The bearing ratio curve of this sectional shape shows a high gradient of bearing ratio curve as shown in FIG. 28 at a range where a bearing ratio is low, i.e. a range at A in FIG. 28. When the magnetic head repeats a contact start-stops on the surface shown in FIG. 27, the micro projections has less contact with the head slider surface and a pressure W/S (W: a head load, S: an actual contact area between the head slider and the disk surface) is increased, so that either wear-out or deformation is excessively produced and either a magnetic medium or a protective film having a thickness of about several tens of nm on the substrate formed with the micro projections may have remarkable damage. In turn, either wear-out or deformation of the micro projections under a contact start-stops is excessively generated under a relation of $\sigma<W/S$ and is reduced under a relation of $\sigma\geqq W/S$ where $\sigma$ is a yield strength at the micro projection part. Thus, the micro projection is worn out or deformed, resulting in that an actual contact area is increased to have an actual contact area S fulfilling the above-described relation of $\sigma<W/S$ and in this case if the magnetic medium or protective film is not damaged, but formed, a wearing-out or deformation of the micro projection is almost eliminated and a stable surface is exhibited.

Figure 29:
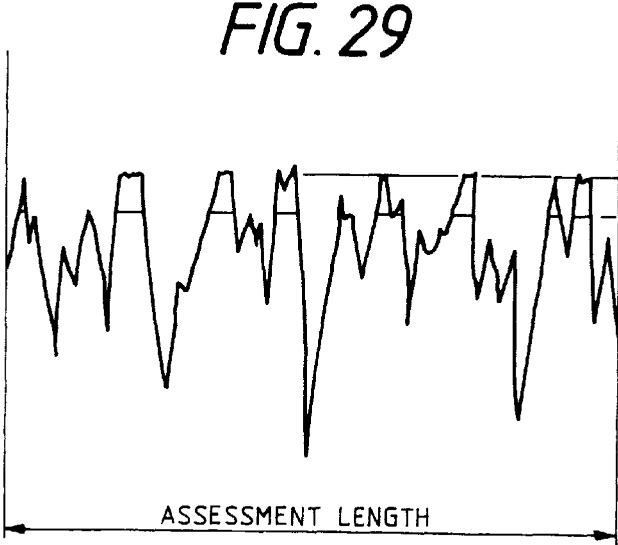
Figure 30:
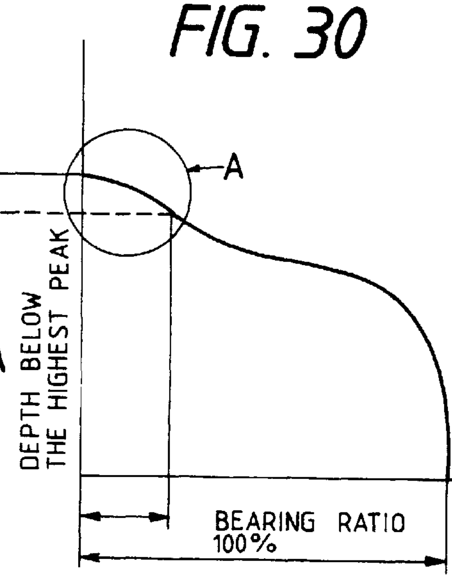
Figure 31:
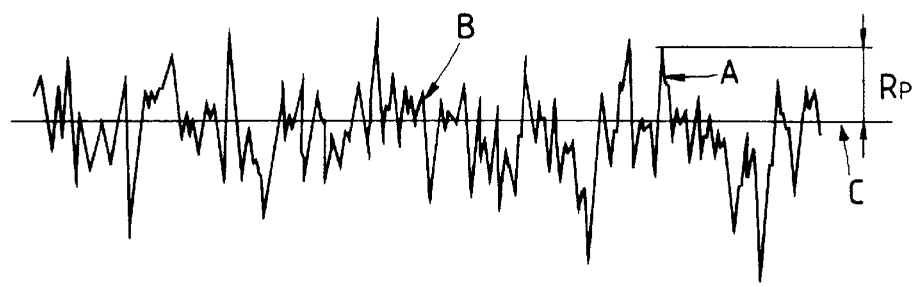
FIG. 31 is an illustrative view for showing micro projections under a sectional shape of the texture machining surface.

Therefore, if the substrate shown in FIG. 27 is further machined at its surface to form a trapezoidal shape having a smooth micro projection as shown in FIG. 29 and an actual contact area between the head slider and the disk surface is increased to have a surface shape of an actual contact area showing a relation of a $\sigma\geqq W/S$ at its initial condition, a pressure at the micro projection is reduced, so that a wearing-out or deformation of the micro projection under a contact start-stops is eliminated and as a result magnetic disk, having a stable and highly reliable surface can be attained. The bearing ratio curve having a sectional shape shown in FIG. 29 becomes one as shown in FIG. 30 and it shows that a gradient of the bearing ratio curve at the surface layer is quite low as shown in FIG. 30A.

Experiments performed by the present inventors show that a prior art texture worked surface having the sectional shape as shown in FIG. 27 has a bearing ratio curve, as its one example, with a bearing ratio at 5 nm to 10 nm from the top part of the sectional curve, i.e. at a depth below the highest peak of 5 nm to 10 nm, the bearing ratio is 0.1% or less and in case of the magnetic disk using such substrate, a head crush was generated at 2,000 times or less of a contact start-stops operation. Further, in case of the magnetic disk using the substrate having a surface as shown in FIG. 29 in which the texture work of the present invention is performed in two-stages, i.e. a surface of a bearing ratio curve with a bearing ratio at a depth below the highest peak of 5 nm to 10 nm being 0.1 to 10%, both the magnetic medium and the protective film maintain each of the functions at 20000 times or more of the time of a contact start-stops operation and kept the stable surface condition.

Figure 15A:
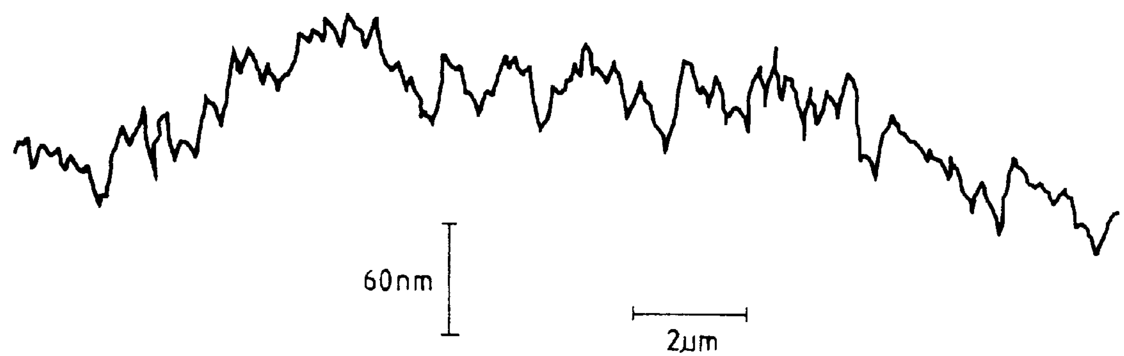
FIGS. 15*a* and 15*b* are each a view for showing a minute variation in a nano-meter order of the disk surface by measuring it with a high resolution SEM and expressing it with a variation of the sectional shape of the surface.
Figure 15B:
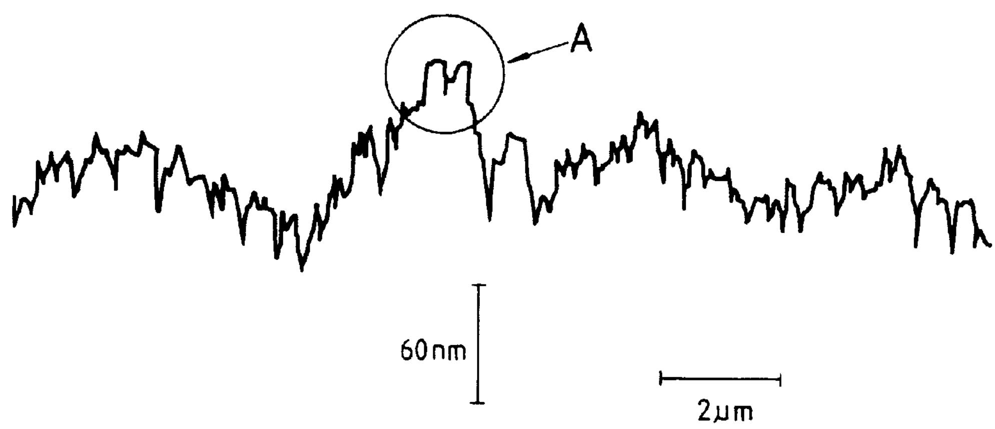
Figure 16:
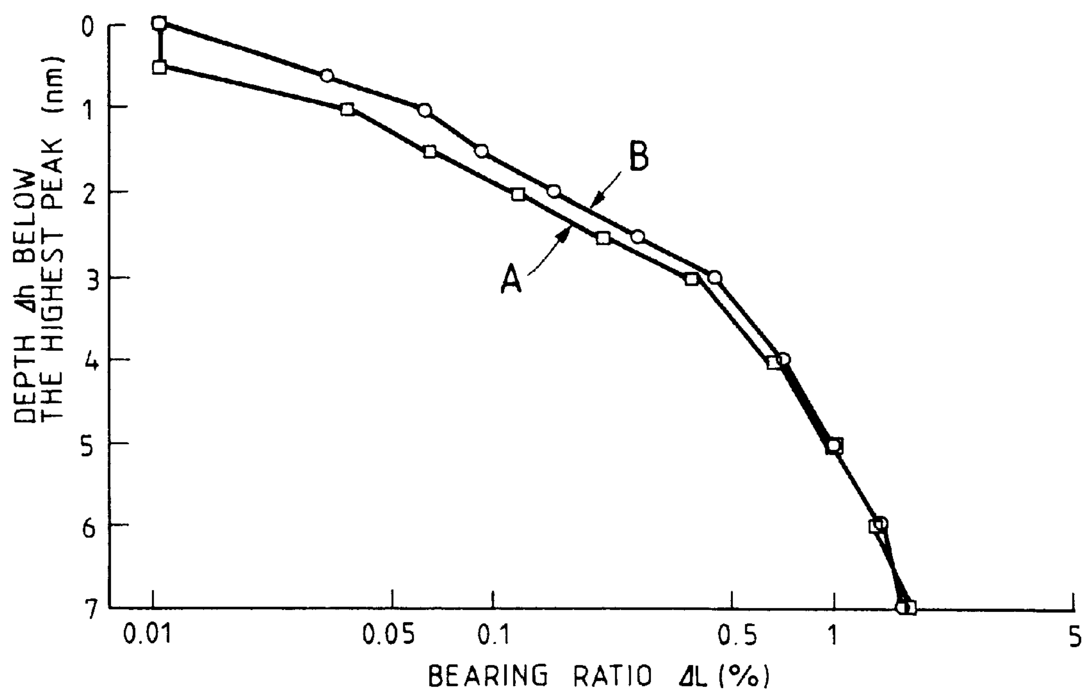
FIG. 16 shows a bearing ratio curve A of a surface layer of the disk before a contact start-stops is performed, and also shows a bearing ratio curve B after a bearing ratio curve is performed.
Figure 17:
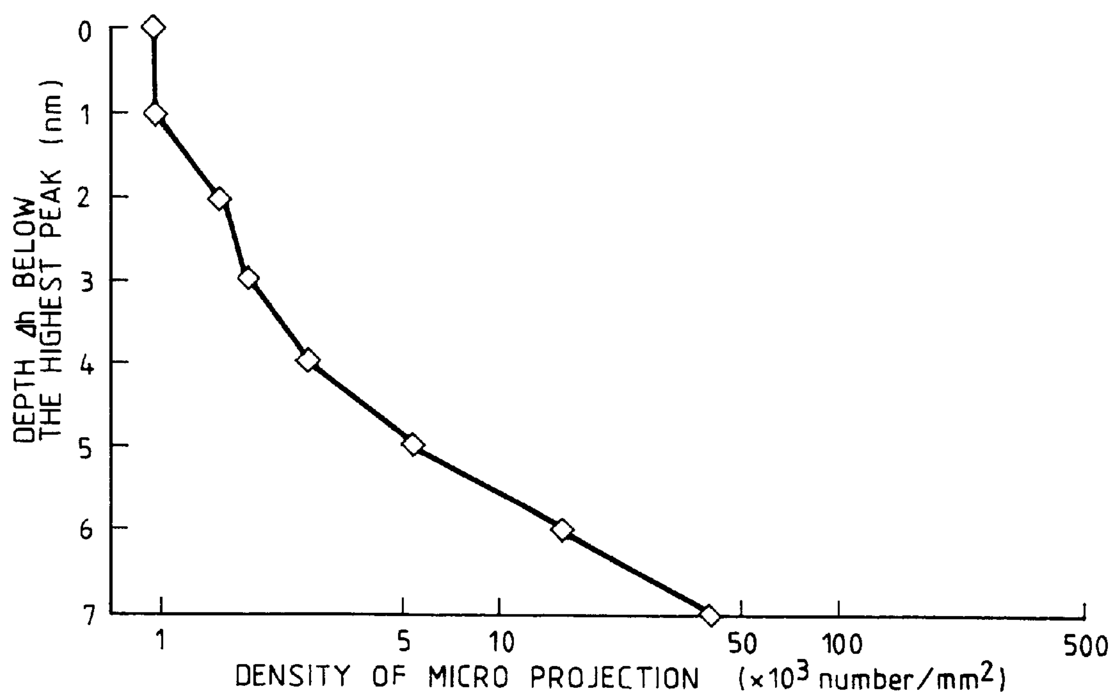
FIG. 17 shows a peak count distribution of the surface layer of the disk, i.e., a density of the micro projection.

Further, the inventors surveyed a detailed variation of the magnetic disk surface after a contact start-stops operation. Experiments performed by the present inventors show that a top of the micro projection at its initial condition is made smooth under a repetition of the sliding movement of the magnetic head. The surface shape measured from SEM observation for the disk surface tested in a contact start-stops operation is shown in FIGS. 15*a* and 15*b*. The surface of the substrate having a contact start-stops testing in respect to the texture substrate and from a bearing ratio curve for the disk surface shown in FIG. 16 (a detailed description will be described later) and further the number of micro projections contacted with the head and the disk is increased. For example, variation at the surface at 20000 times of a start-stops stops operation is made such that as shown in A of FIG. 15*b* a micro projection is varied by a height of 5 to 10 nm from its top part in its initial condition under a contact of the magnetic head with the slider surface, and when the micro projection is varied from the peak count distribution curve at the disk surface under a condition shown in FIG. 17 by 5 to 10 nm from its top part of initial condition, the number of micro projections contacting the magnetic head was several hundred/mm$^2$ to several tens of thousand/mm$^2$. That is, when the height of the micro projection is more than several tens of nm, a floating characteristic of the magnetic head is deteriorated to cause a head crush to occur, and even if the micro projection is less than several tens of nm, in the case of less density, the number of substrates supporting a head load under a sliding movement of the head under a contact start-stops test, i.e. the number of micro projections is reduced, they are made smooth immediately together with the number of contact start-stops, and thus an increased head friction causes the head crush to be easily performed.

If the number of micro projections is less, a pressure of the micro projection receiving a head load is increased, so that the micro projection may easily be reduced or worn out, the lubricant layer or protective layer of several nm formed on the substrate surface may easily be damaged. In case that the density of the micro projections is more than several tens of thousand/mm$^2$ and a density is high, a less variation of the micro projection on the substrate is found due to the magnetic head. However, its contact area is increased, so that the head stickiness is easily generated under influence of a lubricant agent or moisture in the atmosphere, a sliding resistance of the magnetic head in case of performing a contact start-stops is increased, and an element for the magnetic head or arm is easily broken or the disk is made hard to rotate.

Figure 32:
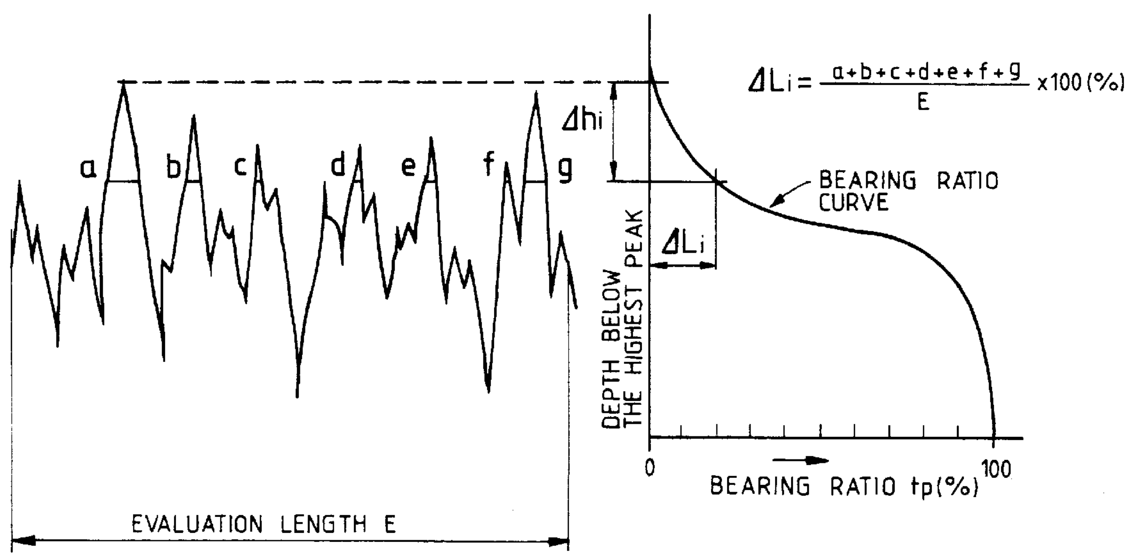
FIG. 32 is a view for illustrating a bearing ratio curve for expressing a nature of the sectional shape of the texture machining surface.

The bearing ratio curve will be described in detail. This bearing ratio curve is called an Abbott-Firestone (or bearing ratio) curve, and in general, it is used for evaluating the sliding characteristic of a bearing and the like. This bearing ratio curve, as shown in FIG. 32, shows a curve in which a sectional curve is cut from a top part of the sectional curve at a specified interval with respect to a reference length E of the surface sectional curve (or surface roughness curve) and a total of each of cut lengths of the sectional curve with this cutting line is divided by the reference length E and this is expressed by a percentage for every cutting line. At the top part of the sectional curve, a cutting length determined by the cutting line is small and a bearing ratio is low. That is, if there is a sliding element on this surface, the sliding part is supported only by the top part of the sectional curve at the beginning of the sliding movement, so that a pressure receiving area is small, a surface pressure is high, resulting in that the top part is frictionally engaged by the sliding element and a wearing-out or a deformation can easily be generated. Therefore, in the case of a surface having a high bearing ratio at the top part of the sectional curve, i.e. a surface expressing a surface shape having a low gradient of the bearing curve in a range of low bearing ratio in the bearing ratio curve, a pressure receiving area is high at its initial condition and a surface pressure of the micro projection supporting the sliding element becomes low, so that an anti-sliding characteristic is improved. In this way, the bearing ratio curve is one of the evaluation means for expressing a load capacity with respect to the sectional curve of a surface slidingly supporting the sliding element.

Therefore, for the surface character of the textured substrate, it is preferable to have a surface formed with uniform micro projections with a density of the micro projections being several hundred/$mm^2$ to several tens of thousands/$mm^2$ as well as to have a height of the micro projections be several nm to several tens of nm in view of the above-mentioned result in reference to the floating characteristic of the head, a head load and a surface variation caused of a friction wear by the head sliding movement.

Figure 6:
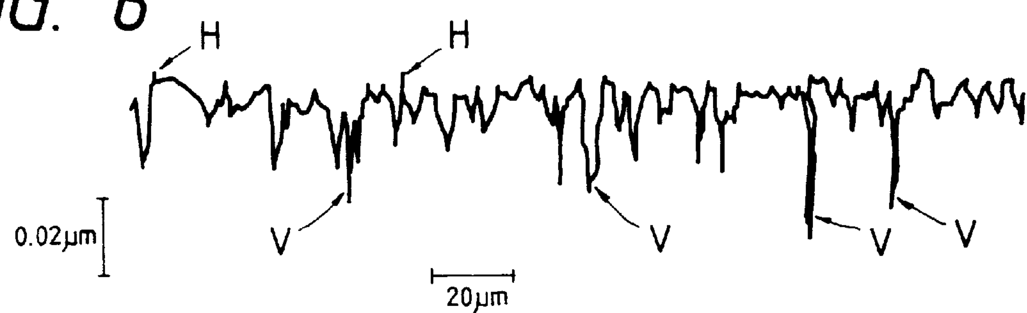
FIGS. 6 and 18 each show an enlarged sectional curve for showing one example of a disk surface machined with a second working head.
Figure 7:
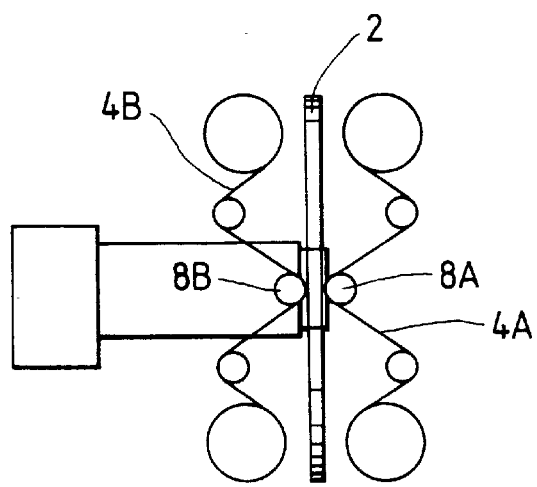
FIG. 7 is a front elevational view for showing a conventional type of disk machining device for forming micro projections.
Figure 8:
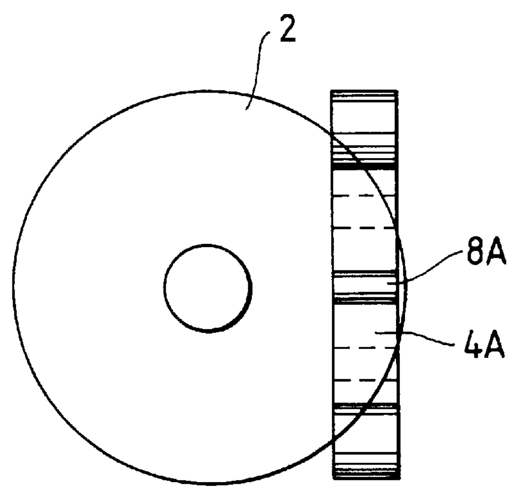
FIG. 8 is a side elevational view for showing this device.

In view of the above, the most suitable surface for the magnetic disk substrate is one in which as shown in FIG. 6, micro projections are formed in a circumferential direction in a pseudo-manner in the substrate surface, that is, a sectional shape of the textured substrate surface has micro projections of a height of several nm to several tens of nm and a density on the substrate surface of several hundred/$mm^2$ to several tens of thousands/$mm^2$.

Figure 1:
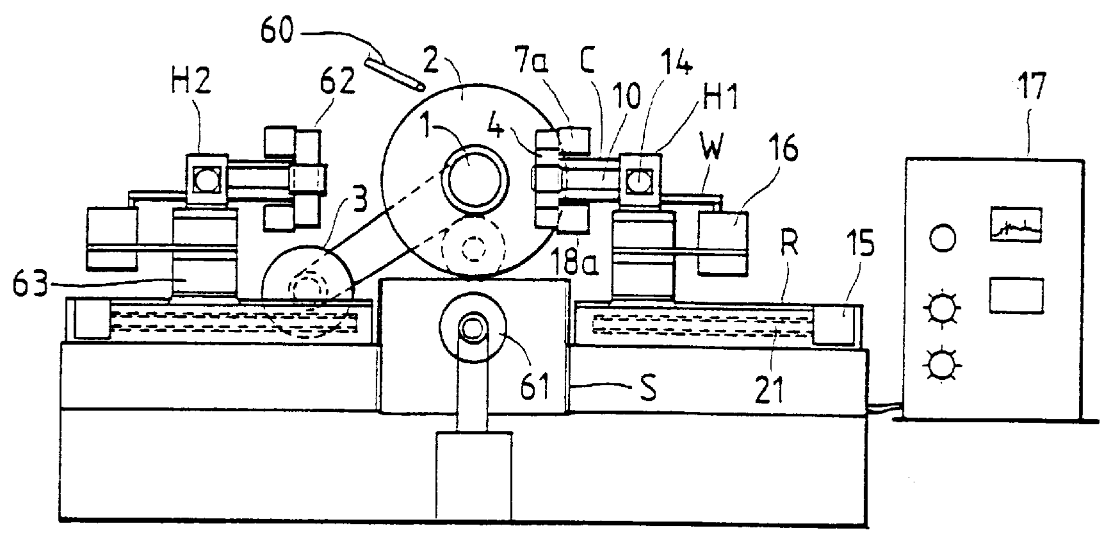
FIG. 1 is a front elevational view for showing one preferred embodiment of a disk machining device of the present invention.

As a method for getting a substrate having such a surface character, there are various methods. As one method, for example, fixed grinding particles such as grinding tape as disclosed in Jap. Pat. Laid-Open No. 54-23294 are used and as shown in FIG. 1. The working head is reciprocated and slid in a radial direction of the substrate in respect to the mirror surface substrate in advance and a circumferential micro projection is formed in a pseudo-manner, and then micro raised portions generated at the shoulders of the projections are controlled in a range from several nm to several tens of nm. Further, the substrate is rotated at a high speed from its light load with a grinding tape having more minute particles than that of the above-mentioned grinding tape, whereby the height of the above-mentioned micro projections is made uniform. A density of the micro projection can be varied optionally by varying a degree of particles of the grinding tape and controlling the number of operating grinding particles.

Several uniform micro projections having a height of the micro projection formed on the magnetic disk substrate of several nm to several tens of nm and having a density of several hundred/$mm^2$ to several tens of thousands/$mm^2$ are contacted with the slider surface of the head to receive the head load when the magnetic head is in a contact start-stops condition. They hold the lubricating film coated on the magnetic disk surface and at the same time prevent an adhering of the magnetic head. Further, since several micro projections are contacted with the head slider surface, a pressure of each of the micro projections is reduced, resulting in that a variation of the micro projections caused by a repetition of a contact start-stops operation, i.e. a deformation or wear-out is reduced and the surface character of the initial condition is kept. In addition, a height of the micro projection is several nm to several tens of nm and is quite short as compared with a floating clearance of the magnetic head (a clearance between the magnetic head and the magnetic disk surface under a normal condition) of 150 to 250 nm. Thus, the magnetic head may float with a sufficient surplus in reference to an accuracy of assembly, an accuracy of rotation of the magnetic disk and a floating variation of the magnetic head and then the head crush caused by the striking of the magnetic head may not be generated.

Therefore, there is scarcely found a wearing-out or damage of the protective film or lubrication film having a thickness of several nm formed on the magnetic disk surface. Further, a head stickiness is not generated. Also an increasing of the head friction caused by a repetition of a contact start-stops is not found and thus a magnetic disk which has a highly reliable head floating characteristic and a favorable anti-sliding characteristic can be provided.

Figure 10:
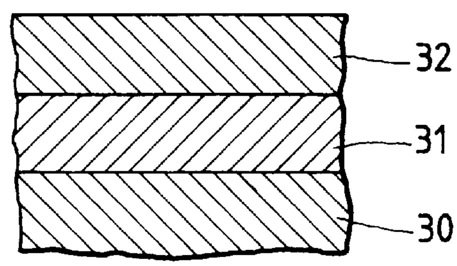
FIG. 10 is a sectional view for showing a prior art thin film magnetic disk.
Figure 18:
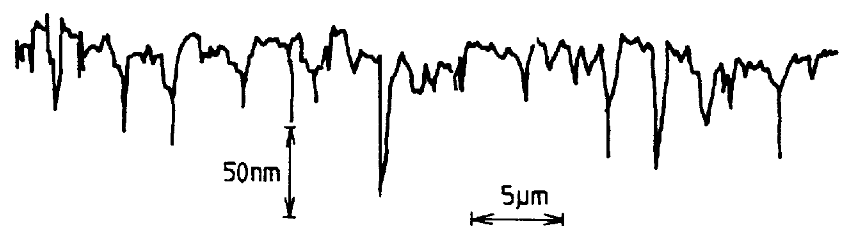

Referring now to the drawings, one preferred embodiment of the present invention will be described. The present invention is an Al disk which is made by a method wherein the disk is coated with a Ni—P plating of a thickness of 10 $\mu$m, the disk is smoothly ground to a surface roughness less than 2 to 3 nmRa, a projection shape is ground by grinding tapes as shown in FIG. 18 (a surface roughness meter step is applied to have a sectional shape measured in an orthogonal direction to the projection with a needle shape of $0.1 \times 2.5$ $\mu$m), a height of the micro projection measured at the shoulder part thereof is uniform in a range from several nm to several tens of nm, a density is set to be 2000 to 3000 pcs/$mm^2$, and an inner diameter of 40 mm and an outer diameter of 130 mm are set. Non-magnetic metallic film 31 of Cr system having a thickness of about 500 nm as shown in FIG. 10 and a magnetic medium 32 of Co—Ni system having a thickness of about 60 nm are sputtered onto the substrate so as to form a carbon protective film 33 and a lubrication film 34 having a thickness of about 50 nm.

Figure 19:
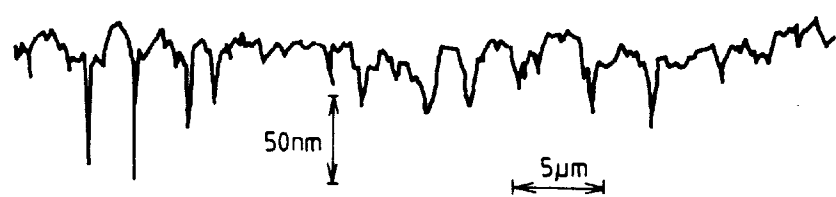
FIG. 19 shows a sectional view for showing a magnetic disk surface in which a magnetic film is formed on the disk shown in FIG. 6*b*.

A surface shape of the magnetic disk thus formed is substantially the same as the shape on the substrate described above as shown in FIG. 19, the surface roughness is 5.5 nmRa (5.3 nmRa on the substrate), a maximum height of the micro projection in a predetermined spacing is 19 nm (20 nm on the substrate) and a density is also substantially the same as that of the former one.

Figure 20:
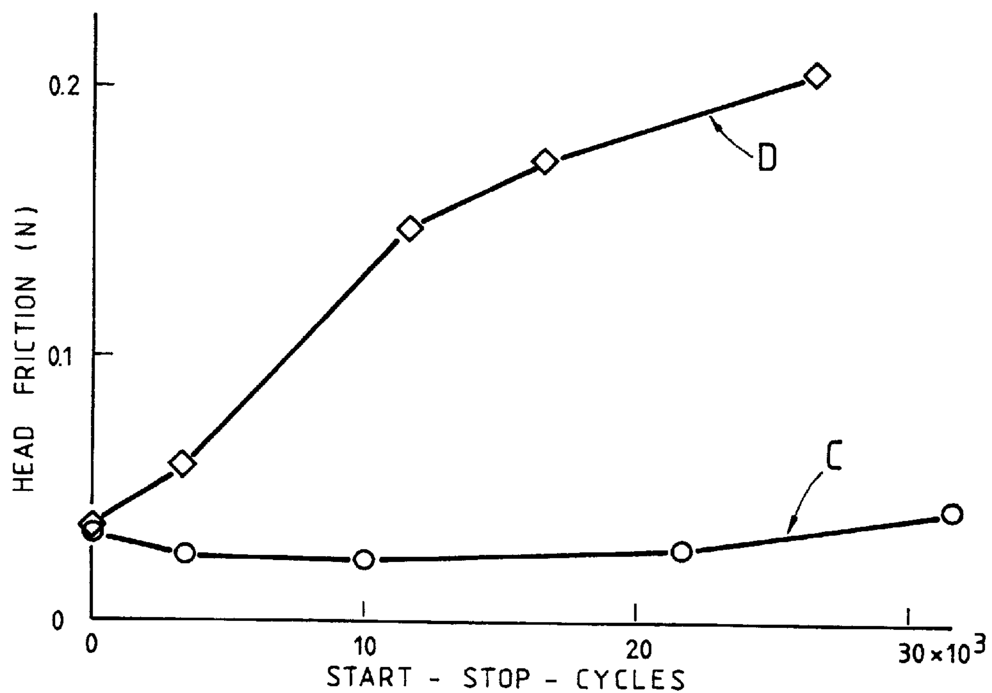
FIG. 20 represents a characteristic of a contact start-stops and shows a comparison between the present invention indicated at C and the prior art indicated at D for a relation between the number of times of a contact start-stops cycle and head-friction.

As a result of a floating test at a head floating clearance of 0.2 $\mu$m with respect to the magnetic disk, a contact between the head and the disk surface is not detected, a superior floating characteristic is indicated, a variation of the magnetic disk surface shape caused by the contact start-stops times is scarcely found, and as shown in FIG. 20, an increasing of the head friction caused by the times of contact start-stops is scarcely made, a problem of the head stickiness is not generated and thus a reliability of the magnetic disk is substantially improved.

Figure 5:
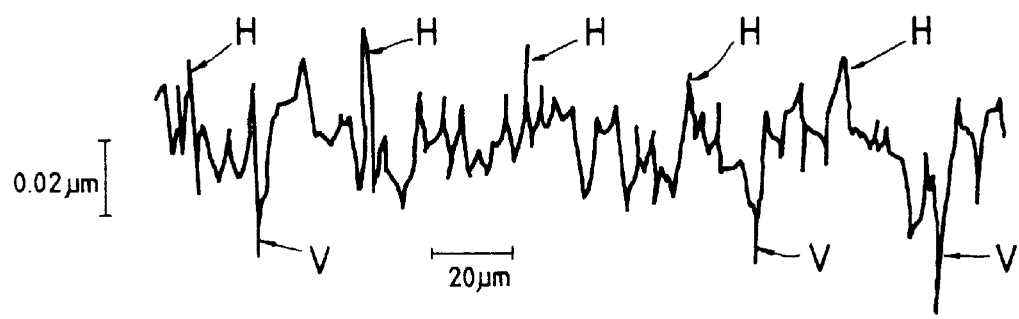
FIG. 5 is an enlarged sectional curve for showing one example of a disk surface worked by a first machining head of the disk machining device shown in FIG. 1.

As an example of comparison, in the case of a magnetic disk having a sectional shape as shown in FIG. 5 and having a micro projection on the substrate according to the prior art, a head friction is increased along with the time of the contact start-stops and a problem of damaging the magnetic head and a head crush occurs. It is apparent that the sectional shape of the disk surface is remarkably varied a by the contact start-stops operation as compared with that of the present invention.

One of the manufacturing methods for the above-described substrate will be described in detail in reference to FIG. 1.

A non-electrolyte Ni—P plating is formed to have a thickness of 10 $\mu$m on both surfaces of an Al disk. The surfaces are smoothly ground to a surface roughness less than 0.01 $\mu mR_{max}$ and are worked with grinding tapes having alumina particles of #3000 particle size to form a micro projection in the Ni—P plated substrate.

Figure 12:
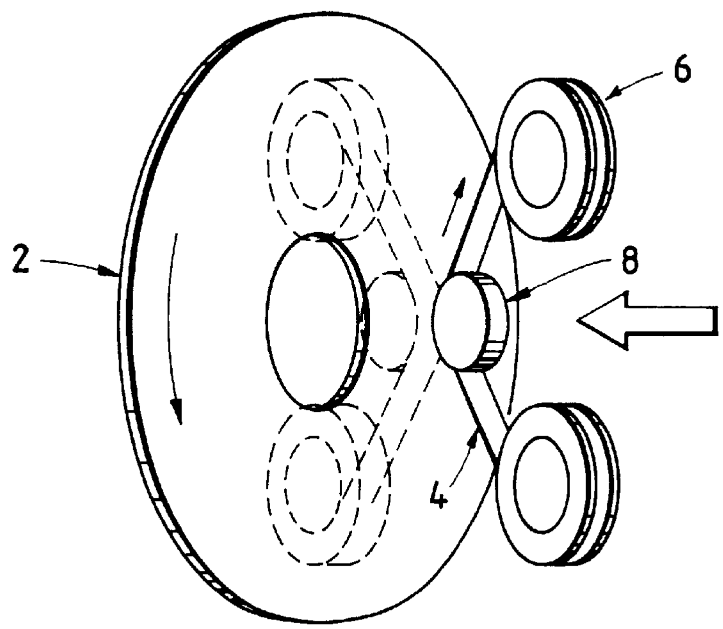
FIG. 12 is an illustrative view for showing a prior art disk machining device.

This surface working method is performed such that as disclosed in Jap. Pat. Laid-Open No. 54-23294 the grinding tapes are pushed against both surfaces of the substrate shown in FIG. 12 with contact rollers, the grinding tapes are reciprocated on the substrate while the substrate is being rotated and the grinding tapes are taken-up in such a way as the grinding tapes are slid on the entire substrate so as to form pseudo-circumferential or helical micro projections in both surfaces of the substrate. The most important point to be taken in case of forming the micro projections is that a pressing force is added to the working grinding tapes that is highly accurately controlled in order to form uniform micro projections on the substrate. As a variable component of the pressing force, there is an influence of the back tension caused by a taking-up of the grinding tapes or a variation in the pressing force caused by a shape of corrugation in a circumferential direction of the disk or a radial warp and the like. Then, as pressing means for the contact rollers applying a minute force, parallel leaf springs are applied, and there are provided a pressing and moving means for moving the parallel leaf springs in a pressing direction, (piezo-electric actuator), a pressing force measuring means attached to the parallel leaf springs (a semiconductor strain gauge) and a control device for controlling the above-mentioned pressing and moving means in response to an output from the pressing force measuring means.

Figure 2A:
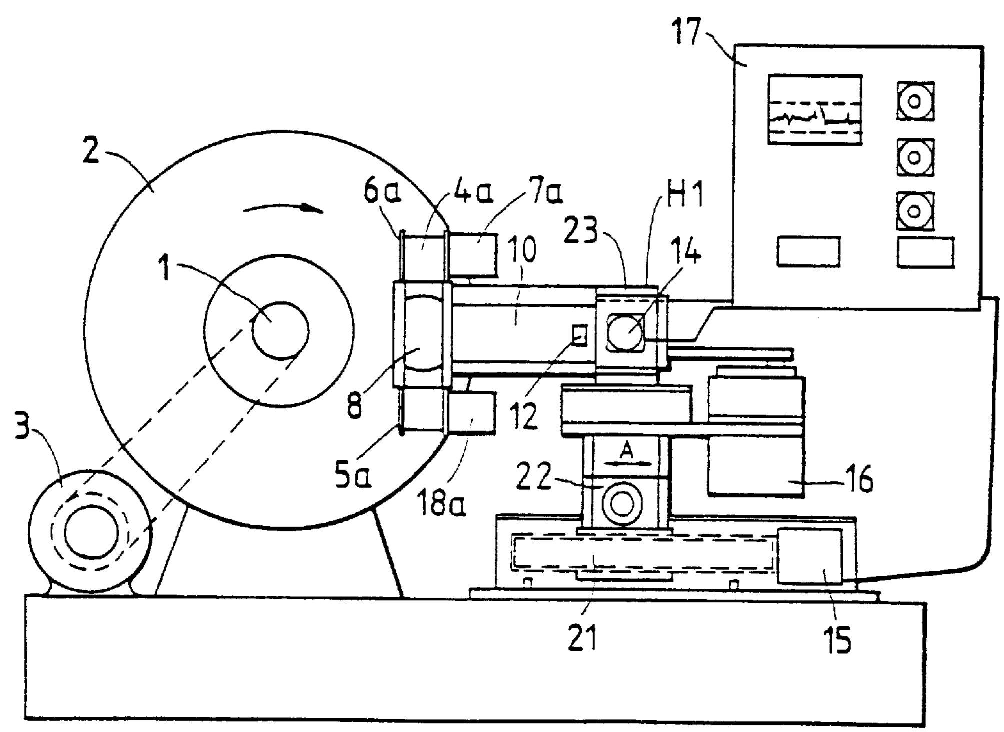
FIGS. 2*a*, 2*b* and 2*c* are a plan view and a top plan view for showing a substantial part of the machining device, respectively.
Figure 2B:
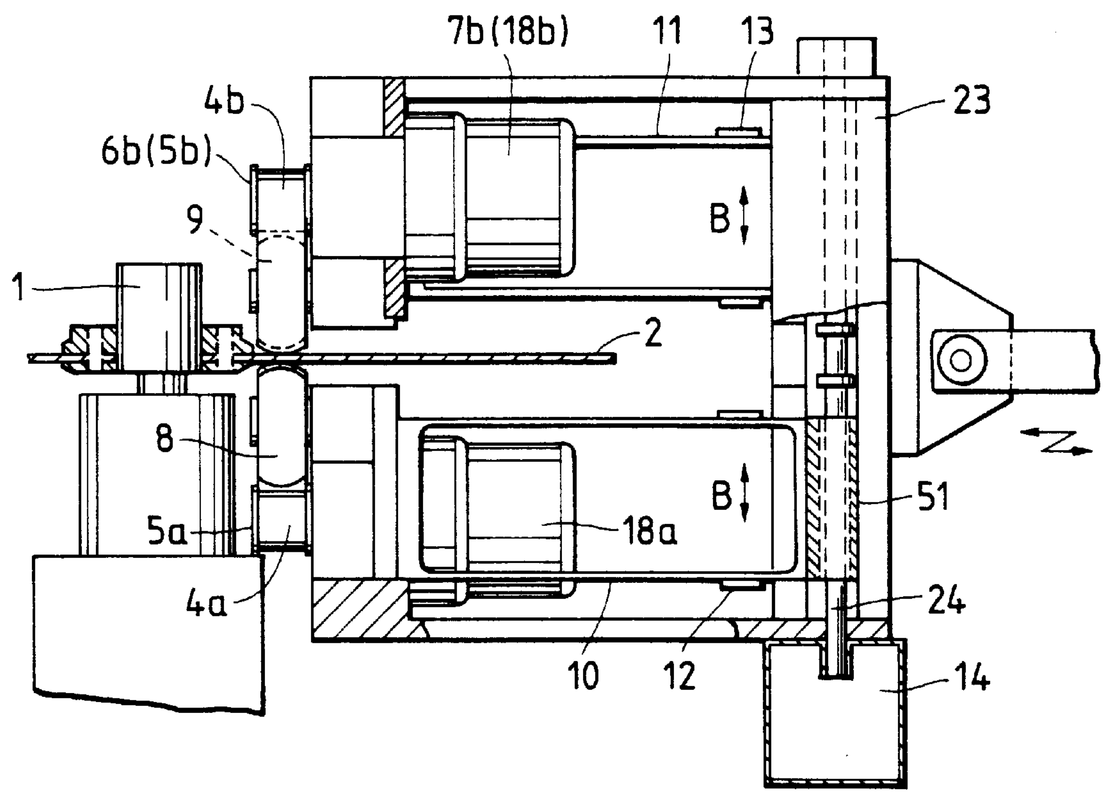
Figure 21:
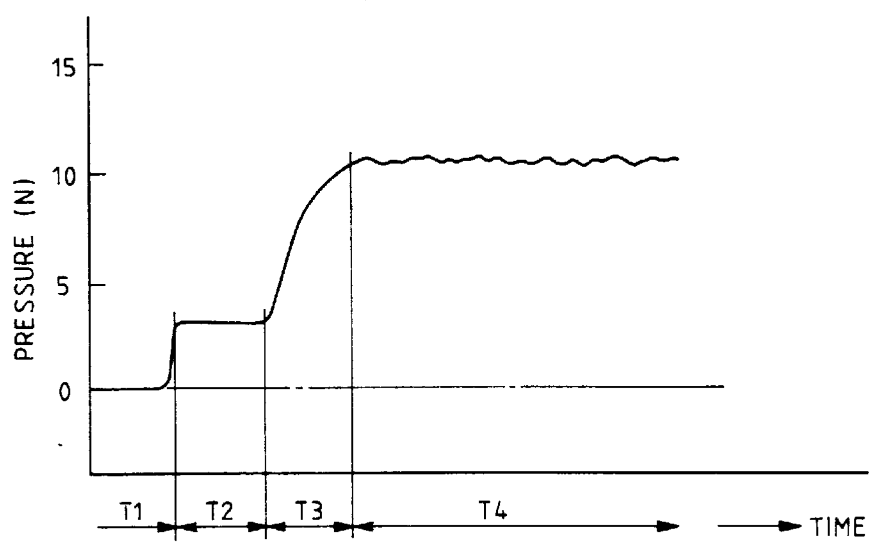
FIG. 21 represents an output from a strain gauge showing a control over a minute pressing force of the present invention, wherein an influence of a back tension caused by a taking-up of the grinding tapes is considered, an actual pressing force in case of working is detected and controlled accurately for a setting pressure force. In this figure, $T_1$ designates an initial time, $T_2$ indicates a tape tension period, $T_3$ shows a pressing force adjusting period and $T_4$ indicates an actual machining period.

FIG. 21 is an output waveform caused by the pressing force measuring means composed of strain gauges 12 and 13 shown in FIGS. 2*a* and 2*b* in case that the working is carried with a set pressing force of 7.5N. Although the output by the pressing pressure measuring means shows 10.5N at both surfaces of the disk, i.e. 12 and 13 in case of working, a back tension 3N caused by the taking-up of the grinding tapes and a variation of the pressing force caused by a shape of substrate, for example, a corrugation in a circumferential direction or a warp in a radial direction of the substrate is controlled by a piezo-electric actuator, an actual pressing force during the machining operation is controlled to have a value of 7.5N±1N. With this arrangement, a sectional shape of the micro projection is made such that a height of the micro projection from a mean surface is 20 to 30 nm and a density of occurrence i.e. a density of a substrate surface of the micro projection can be controlled to the surface character of about 3000 pcs/mm$^2$.

Then, several abnormal micro projections more than a height of 100 nm are generated at the substrate surface character, and in particular at the shoulder of the deep projections and this causes a deterioration and an accident of head crush. Due to this fact, as shown in FIG. 1, the surface was worked in the same manner as that of the first stage by using the grinding tape of which the grain size is smaller than that of the above-described first stage. As a result of the second stage surface working, a height of the abnormal micro projections was reduced, several top portions of the micro projections were made smooth and then the surface having a sectional shape as shown in FIG. 6 could be formed. In order to remove a stain in the disk surface caused by working scales with the first surface working, means for cleaning the disk surface is arranged between the first stage and the second stage.

A constitution of the disk machining device for accomplishing the above-described working means will be described in detail in reference to the drawings.

Figure 2C:
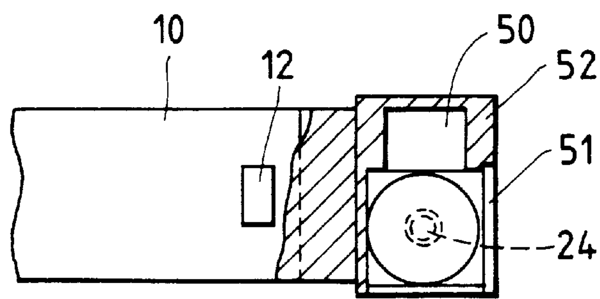
Figure 3:
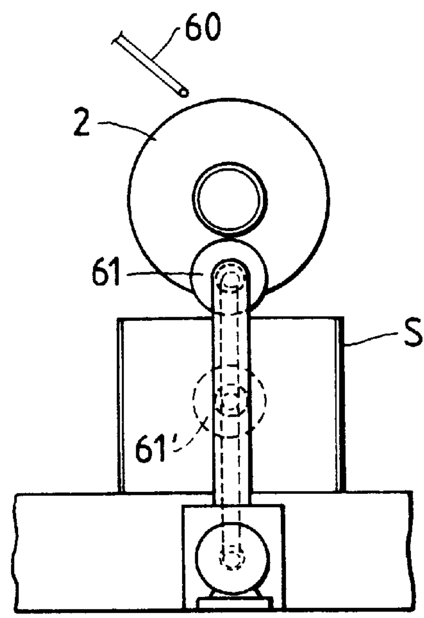
FIG. 3 is a front elevational view for showing a detailed part of the disk cleaning means shown in FIG. 1.
Figure 4:
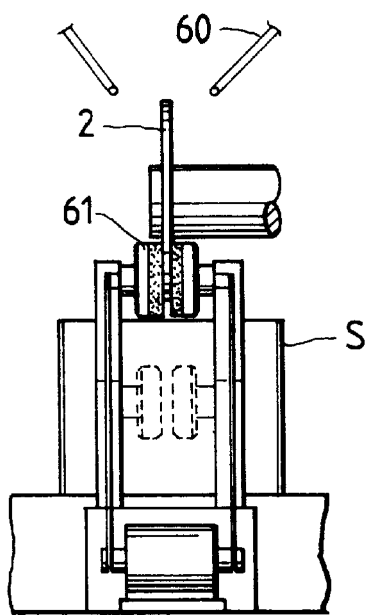
FIG. 4 is a side elevational view for showing this disk cleaning means.

FIG. 1 is a front elevational view for illustrating one preferred embodiment of a disk machining device for use in texture machining of the present invention. FIGS. 2*a*, 2*b* and 2*c* are a top plan view for showing a substantial part of the device. FIG. 3 is a front elevational view for showing a detailed part of a disk cleaning means shown in FIG. 1. FIG. 4 is a side elevational view for showing this disk cleaning means.

At first, an overall arrangement of the disk working device is described in reference to FIG. 1. This device is comprised of a disk supporting means 1 capable of rotatably supporting a disk 2 of a workpiece; a set of contact roller units C capable of pressing the first grinding tape 4 with a pressing force against both surfaces of the disk 2 simultaneously; tape taking-up motors 7*a* and 7*b* for use in taking up the first grinding tape; an oscillating means W capable of oscillating the contact roller units C in a radial direction of the disk 2; a reciprocating means R capable of reciprocating the contact roller units C in a radial direction of the disk 2; a pair of working heads including a first working head having a reciprocating means R capable of reciprocating the contact roller unit C in a radial direction of the disk 2 and arranged at one side of the disk supporting means and a second working head H2 having the same constitution as that of the first working head H1, arranged at an opposite side of the first working head H1 with respect to the disk supporting means and having a second working head H2 having a second grinding tape with its particle diameter lower than that of the first grinding tape installed in place of the first grinding tape. The device further has disk driving motor associated with a disk rotating means capable of rotating disk 2 in such a way as a relative speed between said first and second grinding tapes becomes a desired value; a disk cleaning means S arranged between both working heads and capable of cleaning the disk; and a control device 17 capable of controlling both working heads H1 and H2, the disk driving motor 3 and the disk cleaning means S.

Further, the above-mentioned working heads will be described in detail. In FIGS. 2*a*, 2*b* and 2*c*, the working head H1 is provided with a pair of parallel leaf springs 10 and 11 movably supported in reciprocating means R in an axial direction of disk 2; a pressing and moving means 23 for use in moving the parallel leaf springs 10 and 11, eliminating an influence of back tension caused by taking-up of the grinding tapes 4*a* and 4*b* and capable of setting a desired low pressing force; a pressing force correcting means 50 for making an efficient correction of a variation of minute pressing force under an influence of an accuracy of the disk shape when the disk is worked (for example, a piezo-electric actuator and the like); contact rollers 8 and 9 fixed to parallel leaf springs 10 and 11, arranged at both sides of the disk and having their central axes attached in a radial direction of the disk 2; a grinding tape driving device 7 attached to the reciprocating means R and sliding said grinding tapes 4 between the disk and the contact rollers; stress measuring means 12 attached to the parallel leaf springs 10 and 11; and a control means 17 for controlling the pressing and moving means 23 and the pressing correcting means in response to an output from the stress measuring means.

Therefore, in the disk working device, the pressing force is varied in response to a variation of back tension caused by a taking-up of the grinding tape which is a cause of a minute variation of a pressing force, i.e. a diameter of each of the grinding tapes wound around a supply reel and a take-up reel is varied as the working proceeds, and a tension force of the tape is applied. If the variation value is always measured by the stress measuring means 12 and the parallel leaf springs 10 and 11 are adjusted by the pressing and moving means 23, the pressing force of the contact rollers 8 and 9 against the disk 2 can be kept constant irrespective of the variation of the tension force of the grinding tapes. In regard to a corrugation of the disk in a circumferential direction or a variation of a pressing force caused under a warp of the disk in a radial direction when a working is performed, it is possible to provide a correction of minute pressing force under a better response by a pressing force correcting means 50 such as a piezo-electric actuator and the like in order to improve a response of the correction of the pressing force. With the above-mentioned function, an accurate forming of the micro projections can be performed.

The first working head Hi is arranged at one side of the disk supporting means 1 (a right side in FIG. 1) and is applied for forming micro projections (for example, a micro projection of a depth of about 0.04 $\mu$m) at both surfaces of the disk 2. This working head H1 is comprised of a tape taking-up motor 7*a* for use in taking up from lower to upper direction the first grinding tape wound around each of a set of two contact roller units C arranged at both side surfaces of the disk 2; an oscillating means W capable of oscillating the contact roller units C in a radial direction; and a reciprocating means R capable of reciprocating the units in a radial direction. Each of the contact roller units C is composed of a contact roller 8 used for pressing the first grinding tape 4 against the disk 2 and of a pressing motor 14 capable of applying a desired pressing force to the contact roller 8 through the parallel leaf springs 10. To the parallel leaf springs 10 is attached a strain gauge 12 for use in detecting a pressing force. The pressing motor 14 can apply a pressing force to the parallel leaf springs 10 by displacing them in a direction orthogonal to the two surface of the disk. The pressing force correcting piezo-electric actuater 50 can make a correction of better response for the minute variation of the pressing force during the working operation. The oscillating means W is comprised of an oscillating motor 16, and a crank 55 for connecting the shaft of the oscillating motor 16 with the first working head H1. The reciprocating means R may threadably transmit a rotation of the reciprocating motor 15 to the first working head H1 so as to reciprocate the working head.

The second working head H2 has, as described above, the same constitution as that of the first working head except for the installation at the second grinding tape in place of the first grinding tape. The second head H2 is arranged at the other side (left side in FIG. 1) of the disk supporting means and is used for removing the raised portions of the micro projection formed on both surfaces of the disk with the first working head.

A constitution of the working head will be described in detail with reference to FIGS. 2*a* and 2*b*.

Reference number 1 designates a disk mounting rotary shaft installed horizontally, 2 a disk acting as a workpiece, 3 a driving motor for use in rotating a rotary shaft, 21 a rotatably supported screw, 15 a reciprocating and moving motor for use in rotating the screw 21. Reference number 22 denotes a reciprocating and moving block supported movably in a radial direction of the disk, i.e. a direction of arrow A, having an internal thread threadably engaged with the screw 21, and a reciprocating and moving means R is constituted by the screw 21 and the motor 15. Reference number 23 designates a moving body movably supported in the reciprocating and moving block 22 in a direction of arrow A, 16 indicates a vibrating device fixed to the reciprocating and moving block 22 and the moving body 23 is vibrated by the vibrator device 16 with a minute amplitude. Reference number 24 shows a screw rotatably supported by the moving body 23, 14 denotes a pressing motor for rotating the screw 24, 10 and 11 denote a pair of parallel leaf springs movably supported in an axial direction of the disk 2 in the moving body 23, i.e. in a direction of arrow B. A internal thread is made at the supporting block 51 of the parallel leaf springs 10 and 11. Its internal thread is threadably engaged with the screw 24 and the pressing and moving means is constructed by the screw 24 and the motor 14. In case that a poor corrugation in a circumferential direction of the disk or a poor warp in a radial direction is found, a variation in pressing force is generated when a working operation is performed. Due to this fact, the parallel leaf springs 10 and 11 are constructed such that an internal thread is formed in a supporting block 51 provided with a pressing force correcting piezo-electric actuater 50 and then it is slid in a direction B (for adding the pressing force). On the supporting block 51 is mounted a reciprocating block 52 for moving the parallel leaf springs in a direction B through a piezo-electric actuater for moving it by a minute amount. Reference numbers 8 and 9 denote contact rollers rotatably arranged in the parallel leaf springs 10 and 11. The contact rollers 8 and 9 are arranged at both sides of the disk 2 and their central axes are directed toward a radial direction of the disk. Reference numbers 18*a* and 18*b* denote braking torque motors fixed to the moving body 23, 5*a* and 5*b* denote supply reels fixed to the output shafts of the motors 18*a* and 18*b*, 7*a* and 7*b* designate taking-up motors fixed to the moving body 23, 6*a* and 6*b* denote taking-up reels fixed to the motors 7*a* and 7*b*, 4*a* and 4*b* indicate grinding tapes having fine grinding particles such as diamond grinding particles or aluminum grinding particles adhered and held on the substrate such as polyester film with resin as a binder. Both ends of the grinding tapes 4*a* and 4*b* are fixed to the supply reels 5*a* and 5*b* and take-up reels 6*a* and 6*b*. The grinding tape driving device is comprised of the motors 18*a* and 18*b*, supply reels 5*a* and 5*b*, motors 7*a* and 7*b*, take-up reels 6*a* and 6*b*, and the grinding tapes 4*a* and 4*b* which are passed between the disk and the contact roller. Reference numbers 12 and 13 denote strain gauges fixed to the parallel leaf springs 10 and 11, a reference numeral 17 denotes a control device for controlling motors 3, 14 and 15 and the like. The control device 17 controls the motor 14 and the pressing force correcting piezo-electric actuater in response to the outputs from the strain gauges 12 and 13 so as to move the parallel leaf springs 10 and 11.

The disk cleaning means is comprised of rotary scrubbers (made of brush or sponge) for making a simultaneous cleaning of both surfaces of the disk, a scrubber driving motor for rotating these rotary scrubbers, air cylinders (not shown) capable of reciprocating the rotary scrubbers between their dotted line position and solid line position and a liquid tank.

A reference numeral 60 indicated in FIGS. 1, 3 and 4 and the like designates a supplying part for supplying working liquid and cleaning liquid.

One preferred embodiment of texture work according to the disk working device constructed as above and the preferred embodiment of magnetic disk characteristic in respect to the magnetic disk using the textured substrate will be described.

At first, a method for texture working will be described. The disk is fixed to the disk supporting means. To the control device are set working conditions such as a first pressing force, a relative speed, a vibrating amplitude and a reciprocating time and the like.

In this case, when the disk working device is turned on, the disk is rotated by the motor 3 and at the same time the first working head is oscillated at a set oscillating amplitude by the oscillating motor, the grinding tapes 4*a* and 4*b* are taken up with a specified force by the grinding tape driving device, the pressing force for the disk is adjusted in such a way as its value becomes the first set pressing force, and if the reciprocating and moving block 22 is reciprocated and moved by the reciprocating and moving means R, the micro projection is formed in the surface of the disk 2 with the grinding tapes 4*a* and 4*b*. During this period, the speed of rotation of the disk 2 is adjusted in such a way that the relative speed between the disk 2 and the first grinding tape 4 becomes the first set relative speed. In this way, while the working is promoted, working liquid is continuously supplied from the supplying part 60 to the disk. Then, even if the tensions of the grinding tapes 4*a* and 4*b* are varied and the parallel leaf springs 10 and 11 are deformed, the control device 17 may control the motor 14 in response to the outputs from the strain gauges 12 and 13, i.e. an amount of deformation of the parallel leaf springs 10 and 11, so that the parallel leaf springs 10 and 11 enable the pressing force of the contact rollers 8 and 9 against the disk 2 to be kept constant irrespective of the variation of the tension forces of the grinding tapes 4*a* and 4*b* in response to its amount of deformation. Thus, a minute pressing force can always be kept, resulting in that small and uniform micro projections can be made. Further, as regards the variation of the pressing force caused by the rotation of the disk 2 and as regards the variation of the pressing force under a sliding movement of the working head toward the radial direction of the disk 2, the pressing force is varied under the corrugation in a circumferential direction of the disk 2 or a right angleness in a radial direction or an influence of warp. These variations can be corrected immediately by the pressing force correcting piezo-electric actuator 50 under an instruction of the control device 17.

When the first working head is reciprocated by the desired times, this working head is retracted (is moved rightward as viewed in FIG. 1) and then a supplying of working liquid is terminated.

Then, the rotary scrubber 61 placed at the broken line position 61' in FIG. 3 is lifted up to the solid line position (present position) and this rotary scrubber 61 is rotated by the scrubber driving motor. The disk 2 is also rotated and the cleaning liquid is supplied from the supplying part 60, and the disk 2 is cleaned. Upon completion of this cleaning operation, the rotary scrubber 61 descends down to the broken line position and then the supplying of cleaning liquid is terminated.

Then, the second working head H2 is promoted forward, the disk 2 is worked in the same manner as that of the first working head H1 by this working head.

That is, simultaneously with a rotation of the disk 2 by the motor 3, the second working head H2 is oscillated by the oscillating motor with a desired oscillating amplitude, the grinding tapes 62*a* and 62*b* are taken up under a specified force by the grinding tape driving device, a pressing force against the disk is adjusted in such a way as it may become the second set pressing force. If the reciprocating and moving block 63 is reciprocated and moved by the reciprocating and moving means, micro projections present on the surface of the disk 2 are removed by the grinding tapes 62*a* and 62*b* and made smooth. During this period, the speed of rotation of the disk 2 is adjusted by the disk driving motor 3 in such a way that the relative speed between the disk 2 and the second grinding tape may become the second set pressing force. In this way, the working liquid is continuously supplied from the supplying part 60 to the disk while the working proceeds.

When the second working head H2 is reciprocated by the set number of times, the working head is retracted (in a leftward direction as viewed in FIG. 1) and the supplying of the working liquid is terminated.

Lastly, in the same manner as described above, the disk 2 is cleaned by the disk cleaning means 64 and the disk working device is turned off.

If the disk 2 is removed from the disk supporting means 1, the desired micro projection is formed. Further, if a magnetic medium, a protective film and a lubricant film are formed, it is possible to get the magnetic disk which is superior in an anti-sliding characteristic.

Then, a practical example of the present invention will be described.

A practical example in which a micro projection is formed on the disk 2 having Ni—P plated on an Al disk with a thickness of about 10 $\mu$m will be described in reference to FIGS. 5 and 6.

FIG. 5 is an enlarged sectional curve for showing one example of surface character of the disk worked by the first working head of the disk working device shown in FIG. 1. FIG. 6 is an enlarged sectional curve for showing one example of the surface character of the disk worked with the second working head.

The first grinding tape is operated such that the disk 2 is worked with the first working head H1 while water soluble cutting liquid is being supplied with grinding particles of $Al_2O_3$ having a particle diameter of 3 $\mu$m, a first pressing force being 4N, a first relative speed being 4 m/sec and an oscillating amplitude being 1 mm. As a result, micro projection having a depth V of about 40 nm was formed as shown in FIG. 5 in the surface of the disk 2, the raised height of about 30 nm (micro projection) H was present and a raised ratio had a relation of H/V>5. The raised height showed a certain disturbance.

The second grinding tape was operated such that it has $Al_2O_3$ grinding particles having a particle diameter of 0.5 $\mu$m, with the second pressing force being 2N, the second relative speed being 8 m/sec and an oscillating amplitude being 1 mm. The disk cleaned with pure water was worked by the second working head H2 while water soluble cutting liquid was supplied. The surface of the disk 2 had a depth of the micro projections V kept at about 40 nm as shown in FIG. 6, a raised height was decreased less than about 10 nm, a low disturbance was, a raised ratio H/V of about 0.25 thus, the desired micro projections were attained.

According to the above-described preferred embodiment, since only the raised portions generated at the shoulder portions of the micro projections were tried to be removed by the first working head, it has an effect that a micro projection depth V is 20to 100 nm, a raised height (micro projection) H has a relation of $H/V \leqq 0.5$ which enables a smooth surface having this ratio to be provided. Further, any kind of micro projection can be formed if the degree of grain or grinding particle quality of the grinding tape, the times of reciprocating and sliding movement on the disk and a pressing force and other working conditions are varied.

Figure 9:
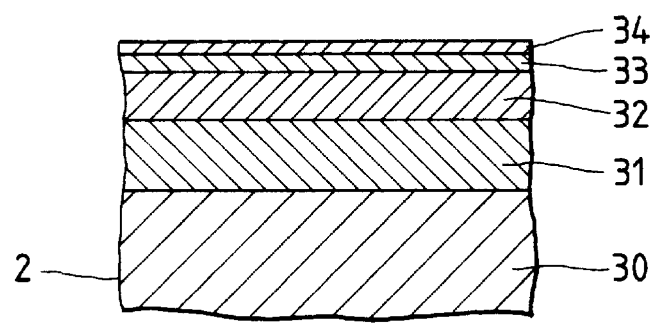
FIG. 9 is a sectional view for showing a thin film magnetic disk having the substrate of the present invention.

Under application of this method, the thin film magnetic disk 2 applied as a substrate as shown in FIG. 9 having a non-magnetic metallic film 31, a magnetic medium film 32, a carbon protective film 33 and a lubricant film 34 on the substrate 30 has a superior head floating characteristic, and a remarkable reliability and stability.

Various characteristics of the thin film magnetic disk formed with micro projections of the present invention will be described in detail together with an example of comparison. That is, the following description will show a comparison between the disk having a height of the micro projections being several nm to several tens of nm and a density of the micro projections being several hundred pcs/$nm^2$ to several tens of thousand pcs/mm.

In FIGS. 13 and 14 are shown results of surveying an influence of the head floating characteristic and a head stickiness and another influence on a deformation amount of surface character (micro projection) under a contact start-stops test as well as an influence of head friction with respect to the thin film magnetic disk. The disk is formed by varying various working conditions such as a degree of grinding particle of a grinding tape, the times of reciprocating of the working head and a pressing force and the like to perform a texture on the surface, and by forming a non-magnetic metallic film, a magnetic medium film, a carbon protective film and a lubricant film which are similar to the former case and are formed on the substrate having a different height of micro projections and a varied density. In case that a height of the micro projections is less than several nm (2 to 3 nm), for example, or a substrate which is approximately a polished surface, the surface had a superior head floating characteristic. However, its head friction was increased, a problem of head stickiness was generated, an element for supporting the head was damaged, an excessive load was applied to the disk rotating driving motor and the disk could not be rotated. In case that a height of the micro projection is more than several tens of nm, for example, a micro projection has 90 nm or more, the head friction is low and the head stickiness problem is not generated. However, it showed a poor head floating characteristic and showed an accident of head crush.

Further, in case that the density of a micro projection is less than several hundreds pcs/$mm^2$, for example, 110 pcs/$mm^2$, each of the pressures or the micro projections under the head load was high, a sliding wear-out at the micro projections under a head load was excessive along with the times of a contact start-stops, a lubricant agent or carbon protective film was excessively damaged and a head crush was generated at a value less than a contact start-stops time of about 2000 to 3000. In case of a density of several tens of thousands of pcs/$mm^2$, for example, 80000 pcs/$mm^2$, a contact area between the magnetic head and the disk surface was large, a head stickiness at the start of the contact start-stops operation occurred, an element for supporting the head was damaged when the disk was rotatably driven with an excessive load applied to the disk rotating and driving motor and the disk could not be rotated.

In the above-described preferred embodiment, a method for forming the micro projection by using the grinding tape and some advantages in various characteristics of the thin film magnetic disk having this substrate have been described. However, similar effects may be attained not only in the grinding tape, but also in surface working processes such as a cutting process, a grinding and cutting process, a apping and a polishing and the like and additionally a surface processing method such an etching or a sand blasting process and the like or a dry process pattern forming method. In one preferred embodiment of the present invention, a width of the grinding tape is narrower than that of a working surface of the disk, contact rollers pressing this grinding tape are reciprocated in a radial direction of the disk and the surface of the disk is worked while being oscillated. However, it may also be applicable that a width of the grinding tape is approximately the width of the surface of the disk to be worked, or a grinding tape having a width wider than that of the surface to be worked is used, oscillated in a radial direction of the disk or the disk is worked without any oscillation to get a similar effect.

As another example of an application of the present invention, the disk working method and the working device of the present invention were applied to a protective film surface of the thin film magnetic disk. That is, after the Ni—P plated disk of the substrate is textured, a non-magnetic base film, a magnetic medium and a carbon protective film are sputtered, and during this process, some fine micro projections are adhered to the surface of the disk. So, it is necessary to remove the micro projections without influencing the base of the magnetic medium and the like and to enable a setting of a minute pressing force to be performed so as to make a smooth surface and further to always maintain control of the minute pressing force. In view of this fact, it becomes necessary to provide a disk working device using the grinding tape of the present invention.

Its practical example will be described later.

Figure 22:
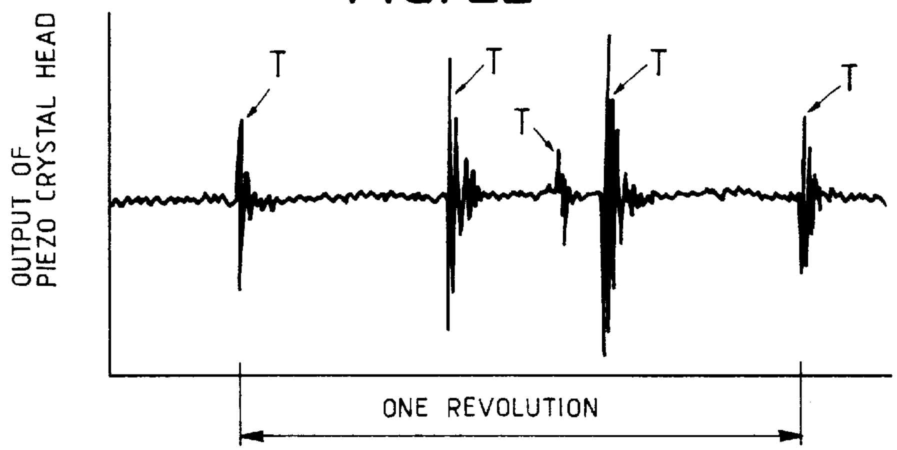
Figure 23:
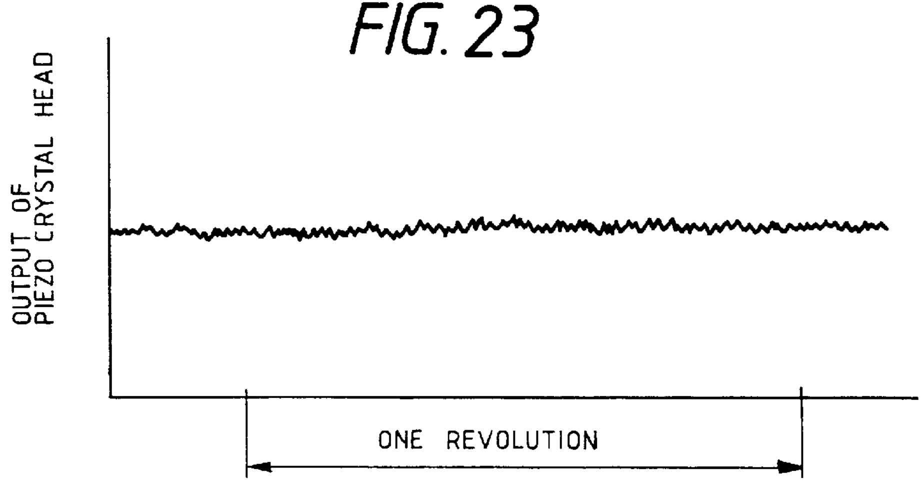

FIG. 22 is a graph for showing an output of the piezo-electric element for the case that a floating test was performed for the floating height of the floating magnetic head having the piezo-electric element thereof of 0.15 $\mu$m before the thin film magnetic disk having Co—Ni magnetic medium and a carbon protective film sputtered on the substrate with an outer diameter of 130 mm and an inner diameter of 40 mm plated with Ni—P and surface polished. FIG. 23 is a graph for showing an output of the above-described piezo-electric element in case that the above-mentioned magnetic disk is finished by the disk finishing and working device shown in FIGS. 1, 2*a*, 2*b* and 2*c* in the same manner as that of the above-mentioned working method under a working condition in which the grinding tapes 4*a* and 4*b* have a particle diameter of diamond of 0.5 $\mu$m, a pressing force of the rubber resilient contact rollers 8 and 9 against the magnetic disk 2 is 2N, the number of rotation of the magnetic disk is 1000 rpm and a reciprocating time of the working head is more than five times. As apparent from these graphs, the magnetic disk 2 before finishing work has an output of the piezo-electric element made by micro projection V having a height of more than 0.15 $\mu$m and to the contrary, the magnetic disk 2 after it is finished by the disk finishing and working device shown in FIGS. 1 and 2 has no micro projection having a height of 0.15 $\mu$m or more, so that it shows that the micro projection has been removed.

Further, as a method for making an accurate removing of the micro projection on the magnetic disk surface, positions of the contact rollers to which grinding tapes are added on the magnetic disk are always detected by a linear scale arranged in the working head reciprocating means and the disk rotating motor is controlled so as to cause a relative speed between the grinding tapes and the disk surface to be always constant. Under this action, an influence of the dynamic pressure caused by some polishing agents present between the grinding tapes and the disk surface during the texture work is made uniform over an entire disk surface. Therefore, it is possible to perform an entire finishing of the disk with a uniform pressing force and to have a uniform effect of removing the micro projections as well as a highly accurate disk.

As described above, in case that the present invention is applied to the protective film surface of the thin film magnetic disk, a minute pressing force can be uniformly applied onto the disk surface, so that the micro projections on the disk surface can be removed little by little and thus the micro projection can be made flat positively without damaging the magnetic medium around the micro projection. Further, since the substrates of the grinding tapes 4_a_ and 4_b_ have diamond particles adhered and held with a binder such as resin, if a quite high striking force is applied to the grinding tapes, this striking force can be absorbed with the binder and soft contact rollers, resulting in that the magnetic medium other than the micro projection may not be damaged.

In regard to the grinding tapes applied in the present invention, it is necessary to provide the grinding tapes having uniform cutting and grinding particles in order to make an accurate formation of a micro projection, have a height of micro projection of several nm to several tens of nm and a density of several hundred pcs/mm$^2$ to several tens of thousands of pcs/mm$^2$ under a stable formation.

Figure 24:
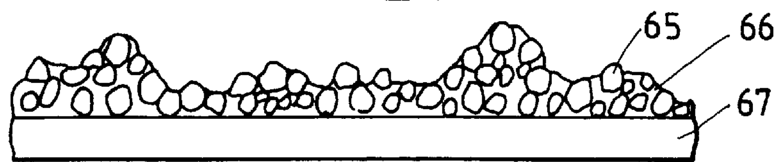
FIG. 24 shows a sectional structure for showing a prior art grinding tape.
Figure 25:
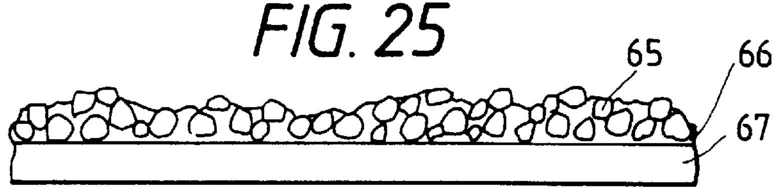
FIG. 25 shows a sectional structure of a grinding tape of the present invention.

A prior art grinding tape as shown in FIG. 24 is made such that fine grinding particles 65 are dispersed within resin 66, coated over a polyester film 67 and then heat treated, wherein its sectional shape has large uneven corrugations and its effective grinding particle cutting blade contributed to the surface working is unstable. Due to this fact, the surface of the prior art grinding tape is made such that extremity ends of the grinding particles on the surface of the grinding tape are corrected uniformly by a truing and dressing of the grinding tape shown in FIG. 26 in such a way as one in which the disturbance in roughness at the extremity ends of the grinding particles is less than 50 nm and an effective acting grinding particle density becomes several tens to several hundred pcs/mm$^2$ as shown in FIG. 25. In addition, the truing and dressing processes for the grinding tape will be described in detail in reference to FIG. 26. A grinding tape 70 is taken up with a grinding tape take-up motor 74 while the grinding tape 70 is being held between a dressor 71 having diamond particles fixed to its cylindrical surface and a roller 72 having a surface of back-up soft material. At this time, in order to make a uniform tension of the tape, the grinding tape for correcting the surface is supported by an output shaft of the braking torque motor 74. Minute pressing force is applied to the dressor 71 and a piezo-electric sensor 76 is arranged at the rotary shaft of the roller 72 in order to control the pressing force. With the grinding tape correction device, the grinding particle layer in the grinding tape surface becomes flat, resulting in that a disturbance of the number of the effective acting grinding particles can be reduced and so an accuracy of the micro projection at the textured surface can be improved. A reference numeral 75 indicates another truing and dressing method for another grinding tape, wherein a so-called self-correcting type dressing method is used in which the surface of the grinding tape is slid with the same grinding tape surface to perform the dressing. Further, this reference numeral 75 denotes rollers for applying a pressing force to the grinding tape having the grinding particle surfaces to be pressed contacting to each other. Even with this method, the same result as that described above can be attained.

Figure 26:
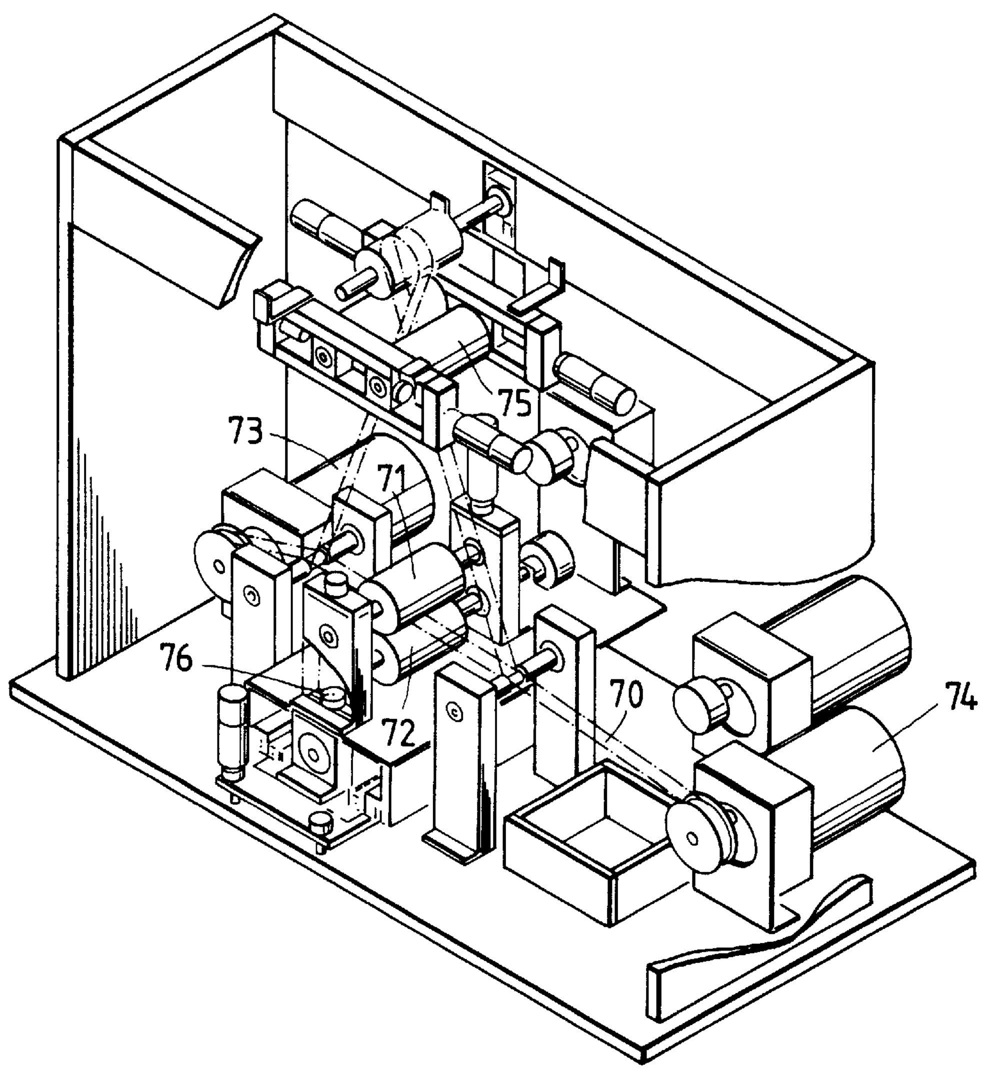
FIG. 26 shows a schematic view of a grinding tape dressing and truing device for use in making a grinding tape of the present invention.

Due to this fact, the extremity ends of the grinding particles on the grinding tape surface were uniformly corrected by the grinding tape truing and dressing method shown in FIG. 26. A density of the micro projections could be controlled in a range of several hundred pcs/mm$^2$ to several tens of thousands of pcs/mm$^2$ by controlling a grinding particle diameter of the grinding tape and controlling the dressing condition of the grinding tape.

As described above in detail, according to the present invention, it is possible to provide a disk working method capable of forming quite small highly accurate micro projections in a Ni—P plated substrate and an apparatus to be directly used in performing this method.

In the disk working device, the parallel leaf springs, strain guages and a pressing force correcting piezo-electric actuator are applied to enable the pressing force of the contact rollers against the disk to quite low and always be uniform, so that uniform micro projections which are stable over an entire disk surface and the micro projections formed in the substrate plated with Ni—P are removed little by little, so that the micro projections can be highly and accurately smoothed.

Further, with the above-described disk working device, it is possible to cut the micro projections on the carbon protective film surface little by little to make a positive removal of the micro projections and there is no damage to the carbon protective film around the micro projections and a surface film of the magnetic medium. Therefore, a surface accuracy is ensured and a quite high smooth surface can be attained. As described above, according to the disk working device and its method of the present invention, micro projections having a height of several nm to several tens of nm are formed in the Ni—P plated substrate of the magnetic disk uniformly to have several hundred pcs/mm$^2$ to several tens of thousands of pcs/mm$^2$, resulting in that the head load is received by the above-mentioned several micro projections in view of a characteristic of a contact start-stops operation in which the magnetic head is intermittently contacted with the disk surface, a pressure at each of the micro projections is reduced, and a deformation of the micro projections and its sliding wear is reduced. Further, deterioration of the protective film and lubricant film formed in the micro projection is less and its anti-sliding characteristic can be improved. Since the height of the micro projections is several nm to several tens of nm, even if the head floating clearance is made small (for example, a floating clearance of 0.15 $\mu$m), there is no problem of striking the magnetic head and head crushing and further there is no problem of head stickiness caused by a lubricant film (coated less than a film thickness of several nm) or a head stickiness caused by moisture contained in the atmosphere.

What is claimed is:

1. A magnetic disk, comprising a rigid substrate; a surface over which a magnetic head floats by rotation of the magnetic disk during read/write and wherein the magnetic head starts and stops in contact with the magnetic disk, wherein the substrate is coated with a magnetic film, the substrate has surface micro projections that contact the head during the starts and stops, the surface micro projections have heights from several to tens of nm with respect to a projection height center line and with a density of the micro projections being from hundreds to tens of thousands of pcs/mm$^2$; and wherein a surface of the substrate has a bearing curve with a bearing ratio of greater than 0.1% to 10% at a depth of 5 nm from a highest peak of a sectional profile of the surface micro projections.

2. A magnetic disk as set forth in claim 1, wherein the heights of said micro projections are from 2 nm to 10 nm.

3. A magnetic disk as set forth in claim 1, wherein the density of said micro projections is from 2,000 to 3,000 pcs/mm$^2$.

4. A magnetic disk as set forth in claim 1, wherein the magnetic film is formed on said substrate by sputtering.

5. A magnetic disk as set forth in claim 1, wherein the magnetic film is formed on said substrate by plating.

6. A magnetic disk as set forth in claim 1, wherein said substrate has a Ni—P plated surface.

7. A magnetic disc as set forth in claim 1, wherein said substrate is one of glass and plastic.

8. A substrate for a magnetic disk, comprising the substrate being rigid and having a surface over which a magnetic head floats by rotation of the magnetic disk during read/write and wherein the magnetic head starts and stops in contact with the magnetic disk, wherein the substrate has micro projections that contact the head during the starts and stops, the surface micro projections have heights of several to tens of nm with respect to a projection height center line and with a density of the micro projections being from hundreds to tens of thousands of pcs/mm$^2$; and wherein the substrate has a bearing curve with a bearing ratio of greater than 0.1% to 10% at a depth of 5 nm from a highest peak of a sectional profile of the surface micro projections.

9. A magnetic disk having a rigid substrate, comprising a surface over which a magnetic head floats by rotation of the magnetic disk during read/write and wherein the magnetic head starts and stops in contact with the magnetic disk, wherein the surface micro projections contact the head during the starts and stops, the surface micro projections have heights of several to tens of nm with respect to a projection height center line with a density of the micro projections being from hundreds to tens of thousands of pcs/mm$^2$; and wherein a surface of the disk has a bearing curve with a bearing ratio of greater than 0.1% to 10% at a depth of 5 nm from a highest peak of a sectional profile of the surface micro projections.

10. A substrate for a magnetic disk, comprising a surface over which a magnetic head floats by rotation of the magnetic disk during read/write and wherein a magnetic head starts and stops in contact with the magnetic disk, wherein the substrate has micro grooves formed mechanically thereon by means of abrasives or cutting tools and wherein the substrate has micro projections between the micro grooves that contact the head during the starts and stops, the surface micro projections being from several to tens of nm high with respect to a projection height center line and having a projection density from hundreds to tens of thousands of pcs/mm$^2$; and further wherein the substrate has a bearing curve with a bearing ratio of greater than 0.1% to 10% at a depth of 5 nm from a highest peak of a sectional profile of the surface micro projections.

11. A magnetic disk, comprising a rigid substrate; a surface over which a magnetic head floats by rotation of the magnetic disk during read/write and wherein a magnetic head starts and stops in contact with the magnetic disk, and wherein the disk has micro grooves formed mechanically by means of abrasives or cutting tools, and has surface micro projections that contact a head during the starts and stops, the surface micro projections having heights of several to tens of nm with respect to a projection height center line with a density of the micro projections being from hundreds to tens of thousands of pcs/mm$^2$, and wherein the surface has a bearing curve with a bearing ratio of greater than 0.1% to 10% at a depth of 5 nm from a highest peak of a sectional profile of the surface micro projections.

12. A magnetic disk having a rigid substrate, comprising a surface over which a magnetic head floats by rotation of the magnetic disk during read/write and wherein a magnetic head starts and stops in contact with the magnetic disk, wherein the magnetic disk has microgrooves with micro projections therebetween that contact a head during the starts and stops, and wherein the surface has a bearing curve with a bearing ratio of greater than 01% to 10% at depth of 5 nm from a highest peak of a sectional profile of the surface micro projections, and further wherein the microgrooves are formed by a process comprising the steps of:

applying predetermined first pressure against the disk with first abrasive tape simultaneously from both sides of the disk;

advancing the first tape in a peripheral direction of the disk while reciprocally moving the first tape in a radial direction of the disk with the first tape oscillating in the radial direction;

rotating the disk at a predetermined first relative speed with the first tape to process the disk, while applying a processing solution;

cleaning the disk;

applying second pressure against the disk with a second abrasive tape simultaneously from both sides of the disk, the second pressure being smaller than the first pressure and the second tape carrying finer particles than those of the first tape;

advancing the second tape in a peripheral direction of the disk while reciprocally moving the second tape in a radial direction of the disk with the second tape oscillating in the radial direction;

rotating the disk at a second relative speed with the second tape to process the disk, while applying a processing solution, the second relative speed being greater than the first relative speed; and cleaning the disk.

* * * * *